United States Patent
Okumura et al.

(10) Patent No.: US 12,314,848 B2
(45) Date of Patent: May 27, 2025

(54) COMPUTER SYSTEM AND MODEL TRAINING METHOD

(71) Applicant: Hitachi, Ltd., Tokyo (JP)

(72) Inventors: Tadashi Okumura, Tokyo (JP); Sanato Nagata, Tokyo (JP); Masahiko Ando, Tokyo (JP)

(73) Assignee: HITACHI, LTD., Tokyo (JP)

( * ) Notice: Subject to any disclaimer, the term of this patent is extended or adjusted under 35 U.S.C. 154(b) by 1105 days.

(21) Appl. No.: 16/939,464

(22) Filed: Jul. 27, 2020

(65) Prior Publication Data

US 2021/0049462 A1    Feb. 18, 2021

(30) Foreign Application Priority Data

Aug. 13, 2019  (JP) .................................. 2019-148310

(51) Int. Cl.
*G06N 3/08* (2023.01)
*G06N 3/044* (2023.01)

(52) U.S. Cl.
CPC .............. *G06N 3/08* (2013.01); *G06N 3/044* (2023.01)

(58) Field of Classification Search
CPC ................................. G06N 3/08; G06N 3/044
See application file for complete search history.

(56) References Cited

U.S. PATENT DOCUMENTS

| | | | |
|---|---|---|---|
| 2004/0015459 A1* | 1/2004 | Jaeger | G06N 3/08 706/15 |
| 2016/0155049 A1 | 6/2016 | Choi | |
| 2018/0253640 A1* | 9/2018 | Goudarzi | G16H 50/20 |
| 2021/0406648 A1* | 12/2021 | Lathrop | G06N 3/08 |

FOREIGN PATENT DOCUMENTS

| | | |
|---|---|---|
| JP | 2004-511866 A | 4/2004 |
| JP | 2016-103262 A | 6/2016 |
| JP | 2017-138808 A | 8/2017 |
| JP | 2019-95599 A | 6/2019 |

OTHER PUBLICATIONS

Verstraeten, David, et al. "Memory versus non-linearity in reservoirs." The 2010 international joint conference on neural networks (IJCNN). IEEE, 2010. (Year: 2010).*
Japanese Office Action received in corresponding Japanese Application No. 2019-148310 dated Dec. 6, 2022.

* cited by examiner

*Primary Examiner* — Markus A. Vasquez
(74) *Attorney, Agent, or Firm* — MATTINGLY & MALUR, PC

(57) ABSTRACT

Provided is a computer system for generating a neural network (NN) used for a task including a training unit that calculates a weighting factor between a reservoir and an output layer using training data, a first storage unit that stores, as node activity information, information on a node activity level of a node included in the reservoir, and a second storage unit that stores model information. When receiving a training execution request for a second task after a training process of a first task is completed, the training unit calculates a weighting factor of the NN used for a third task obtained by combining the first task and the second task, updates the model information based on the calculated weighting factor, and updates the node activity information based on the node activity measured during execution of the training process of the third task.

8 Claims, 18 Drawing Sheets

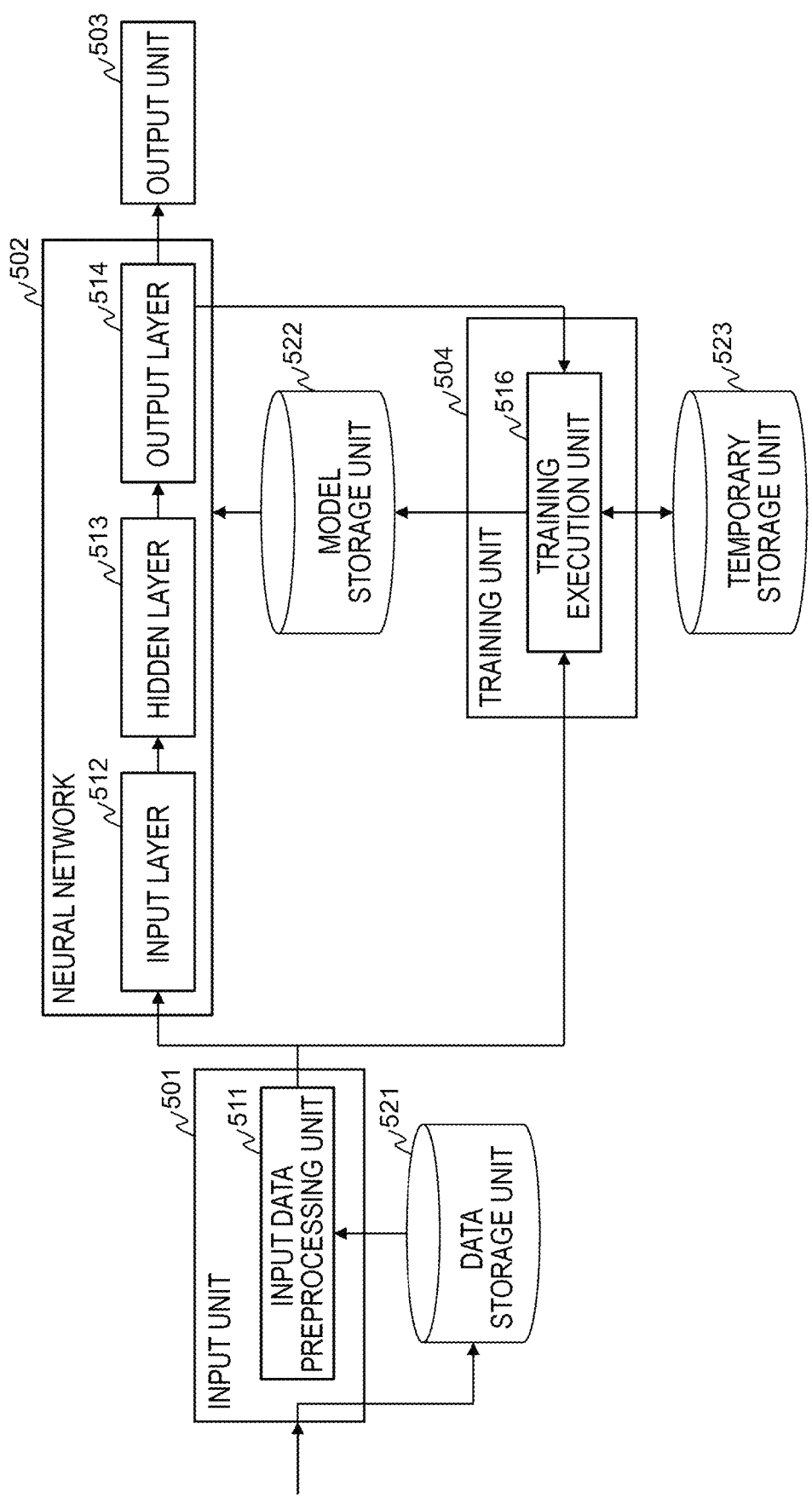

FIG. 6

| | TASK A | | TASK C (A&B) | | TASK E (A&B&D) | |
|---|---|---|---|---|---|---|
| | DATA STORAGE UNIT | NODE ACTIVITY INFORMATION STORAGE UNIT | DATA STORAGE UNIT | NODE ACTIVITY INFORMATION STORAGE UNIT | DATA STORAGE UNIT | NODE ACTIVITY INFORMATION STORAGE UNIT |
| RESERVOIR COMPUTING | TASK A | — | TASK B | — | TASK D | — |
| BACKPROPAGATION | TASK A | — | TASK B | — | TASK D | — |
| MULTITASK LEARNING (RESERVOIR COMPUTING) | TASK A | — | TASK A&B | — | TASK A&B&D | — |
| FIRST EMBODIMENT | TASK A | $Task_{x\_A}$, $Task_{y\_A}$ | TASK B | $Task_{x\_A}$, $Task_{y\_A}$ $Task_{x\_B}$, $Task_{y\_B}$ | TASK D | $Task_{x\_A}$, $Task_{y\_A}$ $Task_{x\_B}$, $Task_{y\_B}$ $Task_{x\_D}$, $Task_{y\_D}$ |

COMPUTER SYSTEM AND MODEL TRAINING METHOD

CLAIM OF PRIORITY

The present application claims priority from Japanese patent application JP 2019-148310 filed on Aug. 13, 2019, the content of which is hereby incorporated by reference into this application.

BACKGROUND OF THE INVENTION

1. Field of the Invention

The present disclosure relates to reservoir computing.

2. Description of Related Art

Recently, a neural network imitating the neural network of human brain has been used in machine learning. The neural network includes an input layer, an output layer, and a hidden layer. In the hidden layer, a desired output such as identification and prediction of information can be obtained by repeating a simple conversion of converting input data into high-dimensional data.

An example of the conversion of the hidden layer includes a non-linear conversion that simulates a firing phenomenon of neurons. The firing phenomenon of neurons is known as a non-linear phenomenon in which a membrane potential sharply increases and an output is changed when a potential exceeding a threshold is input for neurons. In order to reproduce the above-mentioned phenomenon, for example, sigmoid function, hyperbolic tangent function (tanh function), and ramp function (ReLU) are used.

In machine learning, an artificial neural network that processes a desired task is generated by adjusting the connection strength of a connection between layers that corresponds to a synaptic connection of the neural network of human brain.

In training of a neural network, there is known a problem of a so-called catastrophic forgetting of a neural network in which, as the information on a current task is handled, the information on the task handled in the previous training is abruptly lost.

Further, when the neural network processes a specific task, since the parameters of the neural network are optimized for the target task, it is difficult to process task B in parallel while task A is being handled, for example.

When there is no limitation on computer resources, a plurality of tasks could be handled by preparing a neural network corresponding to each task. However, as the size of the neural network increases, the power consumption increases and the installation location and cost of equipment for providing necessary computer resources also increase.

Therefore, there is a need for a technique for generating a neural network corresponding to a plurality of tasks in an environment where computer resources are restricted.

With respect to the above-mentioned problem, a method called Multi-Task Learning is known, in which all tasks are simultaneously trained. However, in order to apply Multi-Task Learning, it is a precondition that data used for training be collected in advance. For this reason, it is not intended for use in the case of adding a new task.

Meanwhile, when the training data of each task is held and a new task is added, a method is conceivable, in which all tasks are trained at the same time using the held training data. According to this method, it is possible to cope with the sequential addition of tasks and data, but there is a problem that a required data capacity increases as an amount of the data and the number of tasks increase, and the time required for re-training also increases.

As a means for solving the catastrophic forgetting, techniques described in JP-A-2017-138808 and JP-A-2016-103262 are known.

JP-A-2017-138808 discloses the "information processing device 10 that performs inference using parameters, including a data acquisition unit 31 that acquires input data, a basic parameter storage unit 41 that stores parameters before additional training, a difference parameter storage unit 40 that stores a first difference parameter which is a difference between a parameter used for inference and a basic parameter, an additional training means 42 for calculating a difference between a parameter after additional training for the basic parameter and the basic parameter as a second difference parameter, an updating means 43 for updating the first difference parameter stored in the difference parameter storage unit 40 based on the first difference parameter and the second difference parameter, and an inference unit 34 that infers input data using a model parameter generated based on the basic parameter and the difference parameter updated by the updating unit".

JP-A-2016-103262 discloses that "at least one node among nodes included in a neural network is selected (S210), a new node is generated in a layer to which the selected node belongs (S220), the new node is connected to the neural network by forming an edge connecting the new node and a node in the neural network (S230), a connection weight of the new node is set based on the connection weight of the selected node (S240), and after the neural network structure is expanded, the connection weight set by the method described above is additionally updated while training is additionally performed (S250)".

While there are various applications of a neural network, a neural network used for recognition of an image or the like, for example, is called a feed-forward network. The feed-forward network handles, as an input, an independent data group at a certain time, and the data is transmitted in the order of an input layer, a hidden layer, and an output layer.

A neural network used for identifying moving images, languages, and the like is called a recurrent neural network. In order to identify data which varies over time, time-series data is input since it is necessary to analyze correlation of data on a time axis. Therefore, in the hidden layer of the recurrent neural network, a process of handling previous data and current data is executed.

In the recurrent neural network, there is a problem that the training process becomes more complicated than a feed-forward network. Further, there is also a problem that computational cost of the training process is high. Therefore, in general, the number of neurons in a recurrent neural network is set to be small.

As a method for avoiding this problem, a method called reservoir computing is known (for example, see JP-T-2004-511866). Examples of the known methods for reservoir computing include Echo-State-Network (ESN) and Liquid-State-Machine (LSM). In either method, the connection of the network forming the reservoir corresponding to the hidden layer is fixed, and the connection between the reservoir and the output layer is trained.

The reservoir computing has an advantage of low computational cost because only the output layer is adjusted.

SUMMARY OF THE INVENTION

The present disclosure provides a training method using reservoir computing for generating a neural network corresponding to all tasks, while taking into consideration the catastrophic forgetting, the restriction of computer resources, and the computational cost saving when tasks are sequentially added.

A typical example of the disclosure disclosed in the present application is as follows. There is provided a computer system that generates, as a model, a recurrent neural network used for a task of obtaining an output result for input data to be processed. The computer system includes at least one computer having an arithmetic unit and a storage device connected to the arithmetic unit, the recurrent neural network includes an input layer, a reservoir, and an output layer, the input layer includes a first node that receives a plurality of time-series data, the reservoir receives an output from the input layer, and includes a plurality of second nodes that form a recurrent network, the output layer includes third nodes that receive an output from the reservoir, and the computer system includes a training unit configured to execute a training process of calculating a weighting factor indicating a strength of a connection between the second nodes and the third nodes using input data including a value of at least one component and training data including target output result including a value of at least one component, a node activity information storage unit configured to store, as node activity information, information on a node activity that is an output value of each of the plurality of second nodes measured during execution of the training process of one task, and a model storage unit configured to store model information that defines a structure of the recurrent neural network. The training unit is configured to, when receiving a training execution request for a second task after completion of the training process of a first task, calculate the weighting factor of the recurrent neural network used for a third task obtained by combining the first task and the second task based on the training data of the second task, the node activity information, and the model information, update the model information stored in the model storage unit based on the calculated weighting factor, and update the node activity information stored in the node activity information storage unit based on node activity of each of the second nodes measured during execution of the training process of the third task.

It is possible to generate a recurrent neural network (model) that corresponds to all tasks even when the tasks are added sequentially, while taking into consideration the catastrophic forgetting, the restriction of computer resources, and the computational cost saving. Problems, configurations, and effects other than those described above will be apparent from the description of the following embodiments.

BRIEF DESCRIPTION OF THE DRAWINGS

FIG. 5 is a diagram illustrating an example of a functional configuration for realizing training using a conventional backpropagation;

FIG. 6 is a diagram illustrating a difference between a training method according to the first embodiment and a conventional training method;

DESCRIPTION OF EMBODIMENTS

Figure 1:
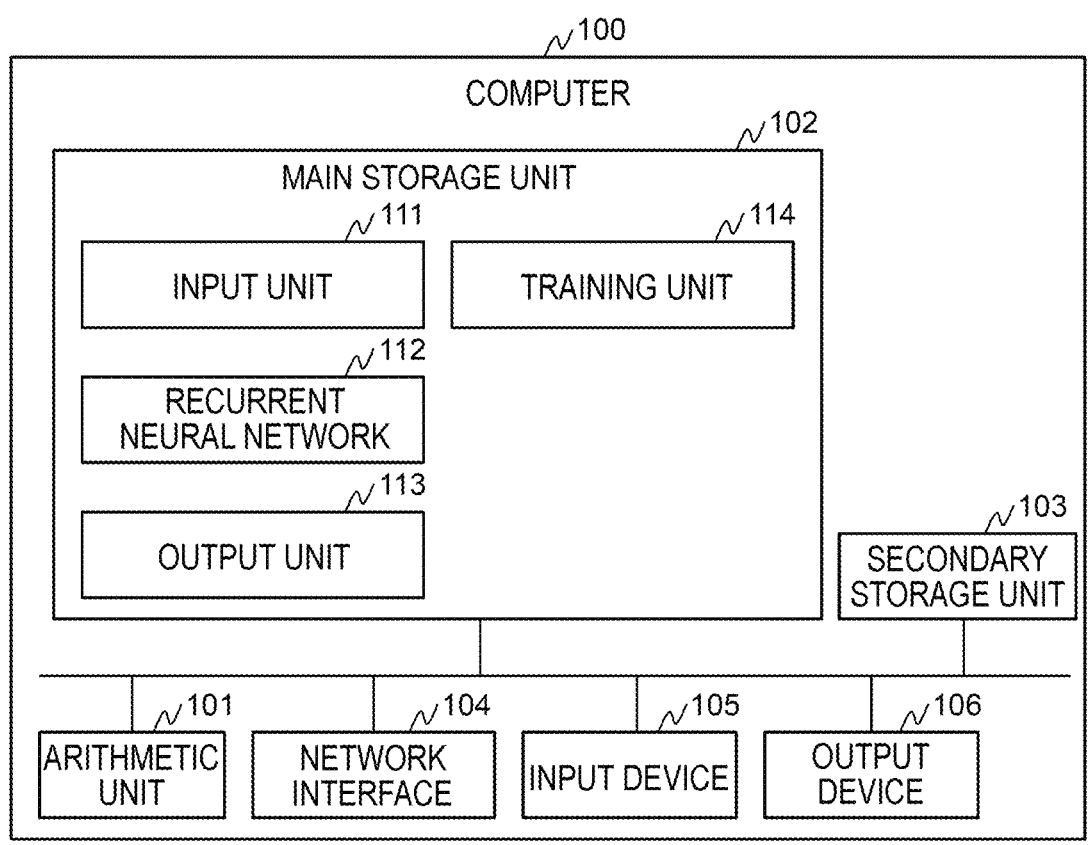
FIG. 1 is a diagram illustrating an example of a configuration of a computer for realizing training using reservoir computing according to a first embodiment.

Hereinafter, embodiments of the present disclosure will be described with reference to the drawings. Note that the present disclosure is not construed as being limited to the description of the embodiments below. It is easily understood by those skilled in the art that the specific configuration may be changed without departing from the spirit or gist of the present disclosure.

In the configurations of the disclosure described below, the same or similar configurations or functions are denoted by the same reference numerals, and duplicate descriptions will not be repeated.

Notations such as "first", "second", and "third" in the description and the like are used to identify components, and do not necessarily limit the number or order.

The position, size, shape, range, and the like of each component illustrated in the drawings and the like may not represent the actual position, size, shape, range, and the like, in order to facilitate understanding of the disclosure. Therefore, the present disclosure is not limited to the position, size, shape, range, and the like disclosed in the drawings and the like.

First Embodiment

FIG. 1 is a diagram illustrating an example of a configuration of a computer 100 for realizing training using reservoir computing according to a first embodiment.

The computer 100 includes an arithmetic unit 101, a main storage device 102, a secondary storage device 103, a network interface 104, an input device 105, and an output device 106.

The arithmetic unit 101 executes processes according to a program. The arithmetic unit 101 may be a processor, a field programmable gate array (FPGA), and the like. The arithmetic unit 101 executes processes according to a program to realize a predetermined functional unit. In the following description, when a process is described with a functional unit as a subject, it indicates that the arithmetic unit 101 is executing a program for realizing the functional unit.

The main storage device 102 is a memory and the like, and stores programs executed by the arithmetic unit 101 and information used by the programs. Further, the main storage device 102 includes a work area temporarily used by the program.

The secondary storage device 103 is a hard disk drive (HDD), a solid state drive (SSD), and the like, and permanently stores a large amount of data.

The network interface 104 is an interface such as a sensor via a network for connecting to an external device.

The input device 105 is a device such as a keyboard, a mouse, a camera, a microphone, and the like, which inputs information to the computer 100. Note that the input device 105 may be configured with a sensor for inputting image or audio data and an AD conversion circuit. When image recording and audio recording are performed using the input device 105, the image file and the audio file are stored in the main storage device 102. The output device 106 is a device such as a display that outputs information from the computer 100.

The main storage device 102 according to the first embodiment stores programs for realizing an input unit 111, a recurrent neural network 112, an output unit 113, and a training unit 114.

The input unit 111 acquires training data or input data for evaluation. The training data includes input data input to the recurrent neural network 112 and a target output (teacher data). Note that the training data and the input data for evaluation are time-series data. In the training process, the input unit 111 inputs the input data to the recurrent neural network 112 and also inputs the target output to the training unit 114. When executing a task, the input unit 111 inputs the input data for evaluation to the recurrent neural network 112.

The recurrent neural network 112 executes an arithmetic process using the input data input from the input unit 111 to calculate an output value. For example, the recurrent neural network 112 corresponding to the identification task serves as a classifier.

The output unit 113 outputs the output value calculated by the recurrent neural network 112.

The training unit 114 performs training of a model that defines the recurrent neural network 112.

Figure 2:
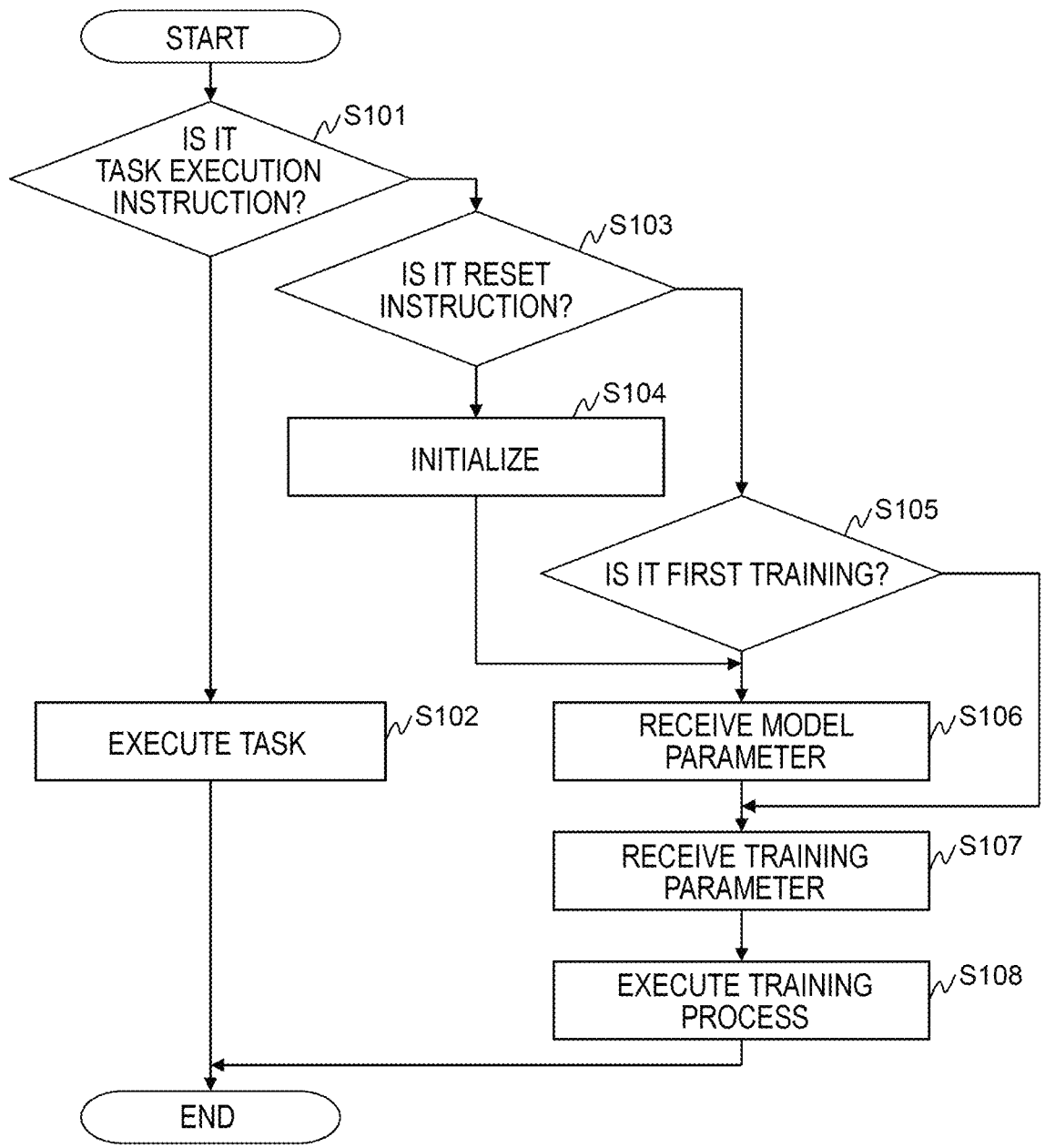
FIG. 2 is a flowchart illustrating a process executed by the computer according to the first embodiment.

FIG. 2 is a flowchart illustrating a process executed by the computer 100 according to the first embodiment.

When receiving an input of an operation instruction, the computer 100 executes the process described below. The operation instruction is one of a task execution instruction, a training execution instruction, and a reset instruction.

First, the computer 100 determines whether the operation instruction is a task execution instruction (S101). The task execution instruction includes input data used in the task.

When it is determined that the operation instruction is the task execution instruction, the computer 100 executes the task using the recurrent neural network 112 (S102), and then ends the process. For example, in the case of a task for identifying voice, voice data input from a microphone and the like is input to the recurrent neural network 112 as input data. The recurrent neural network 112 outputs the result of identification.

When it is determined that the operation instruction is the task execution instruction, the computer 100 determines whether or not the operation instruction is a reset instruction (S103).

When it is determined that the operation instruction is the reset instruction, the computer 100 initializes a model storage unit 312 and a node activity information storage unit 313 (S104), and then proceeds to S106.

When it is determined that the operation instruction is a training execution instruction, the computer 100 determines whether or not it is the first training (S105).

When it is determined that the training is the first training, the computer 100 proceeds to S106. When it is determined that the training is not the first training, the computer 100 proceeds to S107.

At S106, the computer 100 presents a model input screen and receives an input of model parameters (S106). For example, matrices $W_{in}$, $W_{rec}$ and the like are set as model parameters. The model parameters are stored in the model storage unit 312.

Next, the computer 100 presents a training parameter input screen and receives an input of training parameters for the task (S107). For example, the number of identifications (the number of classes) in the identification task, a regularization parameter, and the like are set as the training parameters. The training parameters are input to the training unit 114.

Next, the computer 100 executes a training process (S108), and then ends the process. The computer 100 starts the training process when receiving the input of the training data. When the input of the training data is ended, the computer 100 ends the training process and presents the result of the process. In the training process according to the first embodiment, information on the node activity of the recurrent neural network 112 is held together with the matrix $W_{out}$.

In the training process according to the first embodiment, when executing training for a new task, a new matrix $W_{out}$ is calculated using information on the recurrent neural network 112 having the same structure, the matrix $W_{out}$ trained in the previous task, and the node activity of the recurrent neural network 112.

Figure 3:
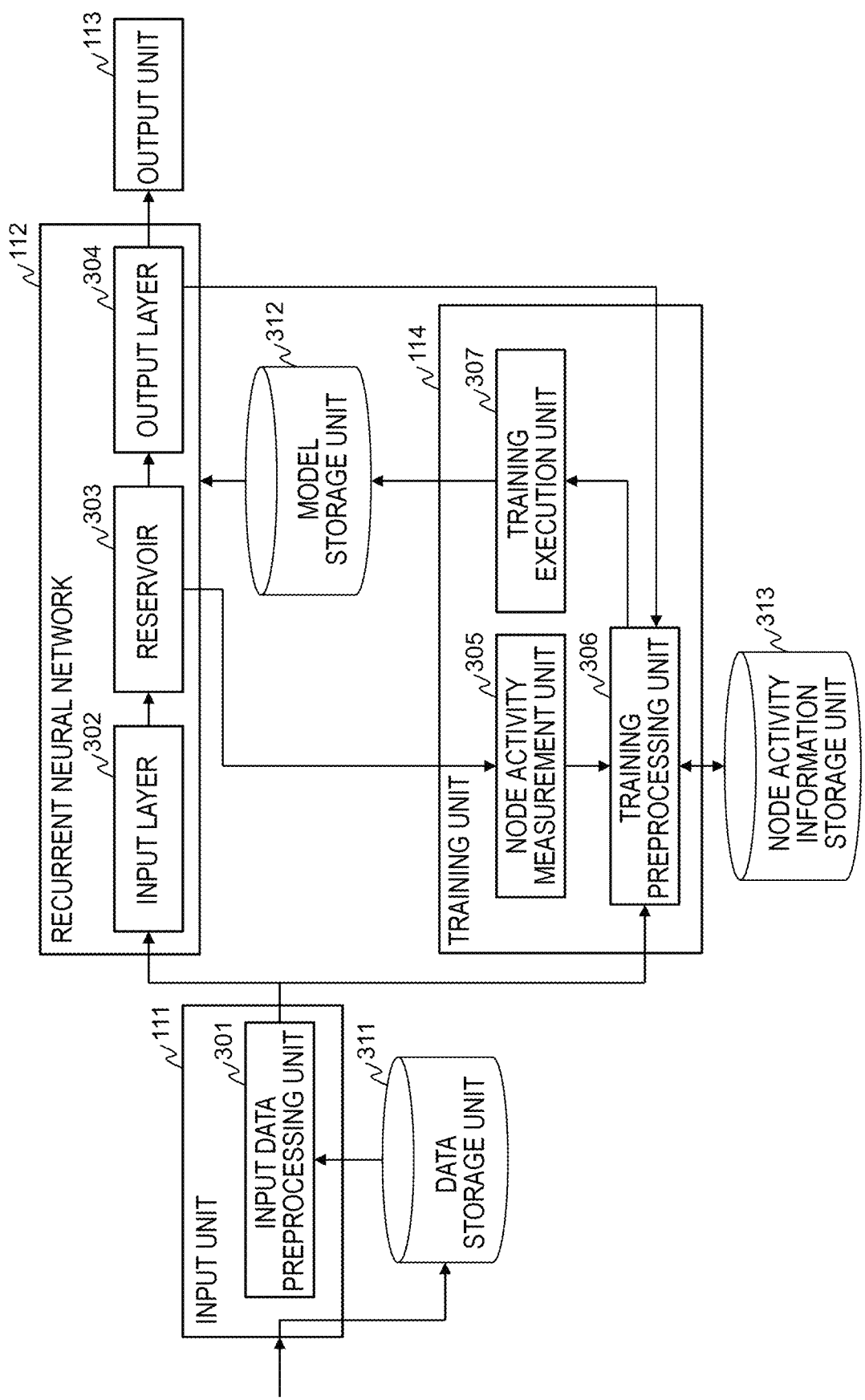
FIG. 3 is a diagram illustrating details of a functional configuration of reservoir computing according to the first embodiment.
Figure 4:
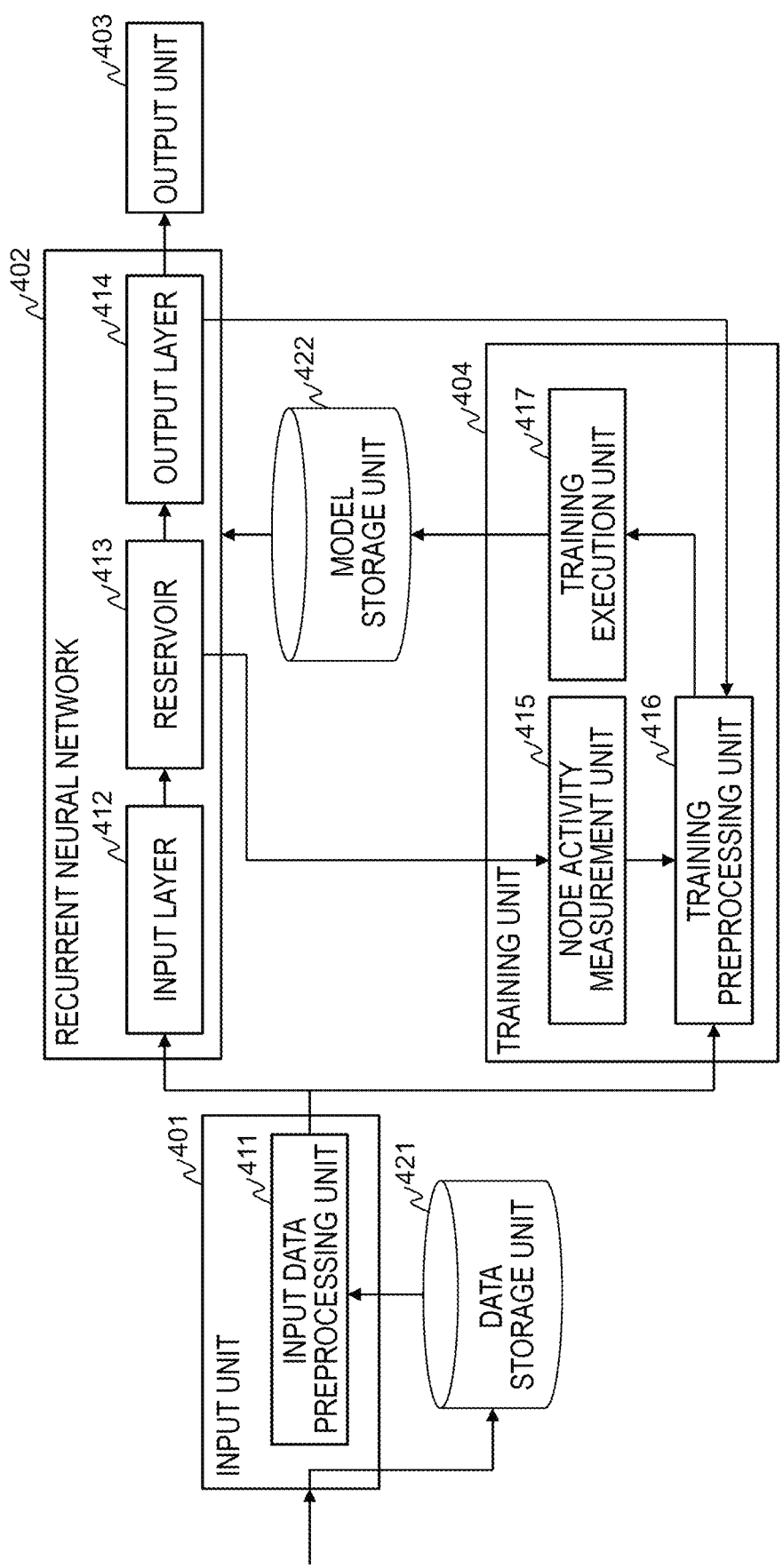
FIG. 4 is a diagram illustrating details of a functional configuration of conventional reservoir computing.

FIG. 3 is a diagram illustrating details of a functional configuration of the reservoir computing according to the first embodiment. FIG. 4 is a diagram illustrating details of a functional configuration of conventional reservoir computing.

The input unit 111 includes an input data preprocessing unit 301. The input unit 111 acquires input data or training data and stores the data in the data storage unit 311. Note that the data storage unit 311 may be realized using a storage area of the main storage device 102 or the secondary storage device 103.

The input data preprocessing unit 301 acquires input data from the data storage unit 311 and executes data preprocessing. For example, conversion from a color image to a monochrome image, Fourier transform for converting sound into frequency data, and the like are executed as data preprocessing. The input data preprocessing unit 301 may store, in the data storage unit 311, the input data after execution of data preprocessing, or may output the input data to the recurrent neural network 112 and the training unit 114.

The recurrent neural network 112 serves as an arithmetic unit that executes a task. The recurrent neural network 112 includes an input layer 302, a reservoir 303, and an output layer 304.

The input layer 302 includes nodes (not shown) that receive input data. The nodes of the input layer 302 are connected to at least one node included in the reservoir 303.

The reservoir 303 includes nodes (not shown) that perform non-linear conversion. The nodes included in the reservoir 303 form a recurrent network. In addition, each node included in the reservoir 303 is connected to a node included in the output layer. When the input data is input from the input unit 111, the reservoir 303 divides the input data by a time width T, and executes an arithmetic process using the time width T as one processing unit.

The output layer 304 includes nodes (not shown) that receive data input from the reservoir 303. The nodes included in the output layer 304 are connected to at least one node included in the reservoir 303.

Here, it is assumed that the input data input to the input layer 302 is u(t), the output value of the node included in the reservoir 303 is x(t), and the value output from the output layer 304 is y(t). A matrix of weighting factors indicating the strength of the connection between nodes connected from the input layer 302 to the reservoir 303 is defined as $W_{in}$, a matrix of weighting factors indicating the strength of the connection between nodes included in the reservoir 303 is defined as $W_{rec}$, a matrix of weighting factors indicating the strength of the connection between the nodes connected from the reservoir 303 to the output layer 304 is defined as $W_{out}$, and a matrix of weighting factors indicating the strength of the connection between the nodes connected from the output layer 304 to the reservoir 303 is defined as $W_{fb}$.

The output value of the node included in the reservoir 303 is given by Equation (1), for example. Equation (1) represents a connection relationship between nodes included in each layer. The output y(t) of the output layer 304 is given by Equation (2).

$$x(t) = \tanh(W_{in}u(t) + W_{rec}x(t-1) + W_{fb}y(t-1)) \qquad (1)$$

$$y(t) = \sum_{i=1}^{n} W_{out}x_i(t) \qquad (2)$$

In Equation (1), tanh function is used as a function for obtaining a nonlinear output. Therefore, the output value of the node included in the reservoir 303 has a continuous value from −1 to 1. In the following description, an output value of a node included in the reservoir 303 is referred to as a node activity.

The training unit 114 trains a recurrent neural network 112 (model) for obtaining an output corresponding to a certain task according to a training method using reservoir computing. As described below, the training unit 114 according to the first embodiment may train the recurrent neural network 112 for obtaining outputs corresponding to a plurality of tasks.

In general model training, a process of adjusting the weighting factor (matrix) of each layer is performed. Meanwhile, in training using the reservoir computing, the matrices $W_{in}$, $W_{rec}$, and $W_{fb}$ are fixed, and a process of adjusting only the matrix $W_{out}$ is performed. In the following description, a configuration in which the matrix $W_{fb}$ is omitted will be described.

The output unit 113 calculates a final value from the value output from the recurrent neural network 112. For example, in the case of the recurrent neural network 112 corresponding to the identification task, the output unit 113 outputs a value of which maximum output is relatively close to 1 from a plurality of output values output from the recurrent neural network 112 by executing an operation using softmax function.

The training unit 114 uses matrices $W_{in}$ and $W_{rec}$ stored in advance in the model storage unit 312. The training unit 114 sets an initial matrix $W_{out}$ before the training starts. For example, a matrix in which all elements are zero is set.

The training unit 114 determines the matrix $W_{out}$ such that the value of Equation (3) is minimized, which is given using an output y(t) calculated as a weighted linear sum of the node activities x(t) using the matrix $W_{out}$, and a target output y*(t) which is an ideal output. Here, N represents the number of training data.

$$\frac{1}{N}\sum_{t}[y^*(t) - y(t)]^2 = \frac{1}{N}\sum_{t}[y^*(t) - W_{out}x(t)]^2 \qquad (3)$$

The minimum of Equation (3) may be obtained without executing an iterative operation by using the least squares method, for example. Therefore, the training process is completed early.

When the number of nodes included in the reservoir 303 is n, the node activity x(t) is an n-dimensional vector. In addition, when the number of nodes included in the output layer 304 is M, the output y(t) and the target output y*(t) are M-dimensional vectors. In this case, the matrix $W_{out}$ is an M×n matrix.

When the n-dimensional vector is handled as a matrix of n rows and 1 column, and an n×n matrix in which n rows of node activity x(t) are stacked is X, the operation for finding the minimum of Equation (3) may be expressed as Equation (4). Here, the matrix XT represents a transposed matrix X, and XTX represents Hadamard product of the matrix XT and matrix X.

$$\frac{1}{N}\sum_{t}[(X^TX)W_{out} - X^Ty] = 0 \qquad (4)$$

Equation (4) may be solved as Equation (5) by finding the inverse matrix of XTX. Here, a part of Equation (5) is defined as Equations (6) and (7). The values of Equations (6) and (7) are values related to the node activity and the time average of the target output.

$$W_{out} = \left(\frac{1}{N}\sum_{t}X^TX\right)^{-1}\frac{1}{N}\sum_{t}[X^Ty] \qquad (5)$$

$$Task_X = \frac{1}{N}\left(\sum_{t}X^TX\right)^{-1} \qquad (6)$$

$$Task_y = \frac{1}{N}\sum_{t}X^Ty \qquad (7)$$

The node activity measurement unit 305 measures the node activity x(t) of each node included in the reservoir 303 of the recurrent neural network 112. The node activity measurement unit 305 outputs the measured node activity x(t) to the training preprocessing unit 306.

As shown in FIG. 4, a computer that executes a training process using conventional reservoir computing includes an input unit 401, a recurrent neural network 402, an output unit 403, and a training unit 404.

The input data preprocessing unit 411 included in the input unit 401 is the same as the input data preprocessing unit 301. In addition, the data storage unit 421 is the same as the data storage unit 311. The input layer 412, the reservoir 413, and the output layer 414 included in the recurrent neural network 402 are the same as the input layer 302, the reservoir 303, and the output layer 304. Further, the model storage unit 422 is the same as the model storage unit 312. The node activity measurement unit 415 and the training execution unit 417 included in the training unit 404 are the same as the node activity measurement unit 305 and the training execution unit 307.

The computer 100 that executes the training using reservoir computing according to the first embodiment includes the node activity information storage unit 313, which is different from the computer that executes the training using conventional reservoir computing.

Each time the training data is input, the conventional training preprocessing unit 416 executes arithmetic operations of Equations (6) and (7) using the target output y*(t) output from the input data preprocessing unit 411, the node activity x(t) output from the node activity measurement unit 415, and the output y(t) output from the recurrent neural network. After the input of the training data is completed, the conventional training execution unit 417 executes an arithmetic operation of Equation (5) using the values of Equations (6) and (7) calculated by the training preprocessing unit 416, to calculate a matrix $W_{out}$. The training execution unit 417 updates the matrix $W_{out}$ stored in the model storage unit 422. The recurrent neural network 402 reads the matrix $W_{out}$ and the like from the model storage unit 422, and the sequence of processes is finished.

Meanwhile, the training preprocessing unit 306 according to the first embodiment updates the node activity information stored in the node activity information storage unit 313 using the node activity measured during the execution of the training process of each task.

Here, the training unit 114 according to the first embodiment will be described with an example in which the training of the task B is newly executed after the training of the task A is executed.

The matrix $W_{out}$ calculated by training only the task A is described as a matrix $W_{out\_A}$, and the matrix $W_{out}$ calculated by training only the task B is described as a matrix $W_{out\_B}$. $Task_x$ and $Task_y$ output to the training execution unit 307 in the training of only the task A are described as $Task_{x\_A}$, and $Task_{y\_A}$, and $Task_x$ and $Task_y$ output to the training execution unit 307 in the training of only the task B are described as $Task_{x\_B}$ and $Task_{y\_B}$. Further, the task of executing the tasks A and B at the same time is described as the task C.

When training the tasks A and B independently, the computer 100 executes the arithmetic operations of Equations (1) to (5). In this case, the matrices $W_{out\_A}$ and $W_{out\_B}$ of the tasks A and B are given by Equations (8) and (9). Here, $T_A$ represents a data range of the task A, and $T_B$ represents a data range of the task B. Moreover, $N_A$ represents the number of training data in the training process of the task A, and $N_B$ represents the number of training data in the training process of the task B.

$$W_{out\_A} = \left(\frac{1}{N_A}\sum_{t=0}^{T_A} X^T X\right)^{-1} \frac{1}{N_A}\sum_{t=0}^{T_A} [X^T y_A] \qquad (8)$$

$$W_{out\_B} = \left(\frac{1}{N_B}\sum_{t=0}^{T_B} X^T X\right)^{-1} \frac{1}{N_B}\sum_{t=0}^{T_B} [X^T y_B] \qquad (9)$$

When the tasks A and B share the matrices $W_{in}$ and $W_{rec}$, and when the matrix $W_{out}$ corresponding to each task is formed and the arithmetic operation of Equation (9) is executed after the arithmetic operation of Equation (8), $W_{out\_A}$ calculated from Equation (8) may malfunction with respect to the input data for evaluation of the task B. That is, the recurrent neural network 112 may not function properly.

In order to realize the recurrent neural network 112 that functions properly for each of the tasks A and B, Multi-Task Learning for training the tasks A and B as one task C is required. The matrix $W_{out\_C}$ in the training of the task C is given as in Equation (10).

$$W_{out\_C} = \left(\frac{1}{N_C}\sum_{t=0}^{T_A+T_B} X^T X\right)^{-1} \frac{1}{N_C}\sum_{t=0}^{T_A+T_B} X^T y_C \qquad (10)$$

Equation (10) may be transformed into Equation (11) using Equations (6) and (7).

$$W_{out\_C} = (Task_{x\_C})^{-1}(Task_{y\_C}) \qquad (11)$$

$$= \left(\frac{N_A}{N_A+N_B}Task_{x\_A} + \frac{N_B}{N_A+N_B}\sum_{t=T_A}^{T_B} X^T X\right)^{-1}$$

$$\left(\frac{N_A}{N_A+N_B}Task_{y\_A} + \frac{N_B}{N_A+N_B}\sum_{t=T_A}^{T_B} [X^T y_B]\right)$$

$$= \left(\frac{N_A}{N_A+N_B}Task_{x\_A} + \frac{N_B}{N_A+N_B}\sum_{t=T_A}^{T_B} Task_{x\_B}\right)^{-1}$$

$$\left(\frac{N_A}{N_A+N_B}Task_{y\_A} + \frac{N_B}{N_A+N_B}\sum_{t=T_A}^{T_B} Task_{y\_B}\right)$$

Further, by adding a regularization term as shown in Equation (12) to Equation (11), an effect of suppressing over-training may be added as in the conventional reservoir computing. Matrix I represents a unit matrix, and α represents a factor in the range of 0 to 1.

$$W_{out\_C} = (Task_{x\_X} + \alpha I)^{-1}(task_{y\_C}) \qquad (12)$$

When a subsequent task is added, the training unit 114 according to the first embodiment uses the property shown in Equation (11) to realize Multi-Task Learning. That is, the training preprocessing unit 306 stores, in the node activity information storage unit 313, as node activity information, the values of Equations (6) and (7) and the number N of data calculated in training of a certain task, or, the history of the node activity, the history of the output y, and the number N of data for calculating Equations (6) and (7).

Usually, in order to realize fast access to data in one-time adjustment of the matrix $W_{out}$, the data used for training needs to be stored not in a low-speed storage device such as an HDD but in a high-speed storage device such as a DRAM. Therefore, it is desirable that the data capacity used for training is as small as possible. Therefore, storing the values of Equations (6) and (7) rather than the history of the node activity as the information on the node activity may reduce the data capacity.

When receiving an input of training parameter of the task B, the computer 100 adds a node that provides an output related to the task B to the output layer 304. At this time, the input layer 302 and the reservoir 303 are not changed.

Each time the training data is input, the training preprocessing unit 306 calculates the values of Equations (6) and (7) for the task C, using the target output y*(t) output from the input data preprocessing unit 301, the node activity x(t) output from the node activity measurement unit 305, the output y(t) output from the recurrent neural network, and the node activity information obtained by training the task A and stored in the node activity information storage unit 313. Note that the values of Equations (6) and (7) may be calculated by deforming the Equations as in Equation (11). After the input of the training data is completed, the training execution unit 307 executes an arithmetic operation of Equation (12) using the values of Equations (6) and (7) calculated by the training preprocessing unit 306, to calculate a matrix $W_{out\_C}$.

When the values of Equations (6) and (7) related to task A are stored in the node activity information storage unit 313, the training preprocessing unit 306 may omit the arithmetic operation when t is in a range from 0 to $T_A$, thereby reducing the cost required for the arithmetic operations of Equations (6) and (7) for the task C.

When task D is added after training the task C, with the task C as the task A, the task D as the task B, and the task combining the tasks C and D as the task C, the recurrent neural network 112 may be trained by the same method. Even when there are three or more tasks to be added, the recurrent neural network 112 may be trained by the same method.

Hereinafter, data capacity of information held by a computer that realizes the reservoir computing according to the first embodiment will be described.

When N sets of training data including m-dimensional input data u(t) and M-dimensional target output y*(t) are input to the computer 100, the data storage unit 311 needs at least (m+M)×N of data capacity. In addition, when the recurrent neural network 112 is a three-layer network as shown in FIG. 3 and the number of nodes of the reservoir 303 is n, the matrix $W_{in}$, the matrix $W_{rec}$, and the matrix $W_{out}$ are an n×m matrix, an n×n matrix, and M×n matrix, respectively, and the model storage unit 312 needs a capacity to store such information. In the description of the present disclosure, only the weighting factor is handled, but when the bias input to the node is also considered, the required data capacity is further increased.

The magnitude relationship between m, n, M, and N generally satisfies (m, M<n<<N). Since the input data u(t) is multidimensionally expanded by the reservoir 303 to enhance the information processing capability, it is often used as (m, M<n). Further, in order to prevent over-training, (n<N) is generally used.

Equation (6) is an n×n matrix, and Equation (7) is an M×n matrix. Since these values do not depend on the number N of data, when the values of Equations (6) and (7) and the number N of data are stored as the node activity information, the data capacity of the node activity information stored in the node activity information storage unit 313 is sufficiently smaller than the data capacity of the training data.

In addition, since it is executed in accordance with the training using reservoir computing, there is no change in the data processed by the training preprocessing unit 306 unless the matrix $W_{in}$ and the matrix $W_{rec}$ are changed, and thus it is not necessary to keep holding the training data in the data storage unit 311 for the purpose of re-training. Therefore, the computer 100 can be required to have reduced data capacity.

Next, a difference between the training using the reservoir computing according to the present disclosure and the training using the backpropagation, which is one of the general model training methods, will be described.

First, the training using the backpropagation will be described. FIG. 5 is a diagram illustrating an example of a functional configuration for realizing the training using the conventional backpropagation. For simplicity of description, the matrices $W_{rec}$ and $W_{fb}$ are omitted, and the matrices $W_{in}$ and $W_{out}$ are described as the training targets.

The computer for executing the training using the backpropagation includes an input unit 501, a neural network 502, an output unit 503, and a training unit 504.

The input unit 501 includes an input data preprocessing unit 511. The input unit 501 stores the input data and the processed input data in a data storage unit 521. The input data preprocessing unit 511 has the same function as the input data preprocessing unit 301.

The neural network 502 includes an input layer 512, a hidden layer 513, and an output layer 514. The nodes included in the hidden layer 513 are not required to build a recurrent network.

The output unit 503 has the same function as the output unit 113.

The training unit 504 includes a training execution unit 516, and executes the training of the neural network 502. The training result is stored in a model storage unit 522. The model storage unit 522 stores a matrix of weighting factors indicating the strength of the connection between the layers. A temporary storage unit 523 temporarily stores a value used in the training using the backpropagation.

The training execution unit 516 trains the weighting factor (matrix) so that the output y(t) and the target output y*(t) are close to each other by repeatedly executing (process A) to (process D) described below. Here, r is the number of executing the adjustment process of the weighting factor.

(Process A) The training execution unit 516 reads, from the model storage unit 522, a matrix between the input layer 512 and the hidden layer 513 and a matrix between the hidden layer 513 and the output layer 514. In the initial state (r=0), each matrix is set at random.

The input unit 501 inputs the input data u(t) to the neural network 502 and inputs the target output y*(t) to the training unit 504. The training execution unit 516 calculates an error E between the output y(t) and the target output y*(t).

Here, the value x(t) output from the hidden layer 513 is given by Equation (13), and the value y(t) output from the output layer 514 is given by Equation (14). Further, the error E is given by Equation (15).

$$x^{r=0} = W_{in}^{r=0} u \quad (13)$$

$$y^{r=0} = W_{out}^{r=0} x^{r=0} \quad (14)$$

$$E^{r=0} = (y^* - y^{r=0})^2 \quad (15)$$

(Process B) In the initial state (r=0), the training execution unit 516 reads the matrix $W_{out}$ (r=0) stored in the model storage unit 522 and stores the matrix in the temporary storage unit 523. The training execution unit 516 calculates a local error from the error E and the partial differential of the matrix $W_{out}$ (r=0). When the sigmoid function is used as the activation function, the training execution unit 516 executes the arithmetic operation of Equation (16) on the value x(t) of the hidden layer 513 and the local error, and updates the matrix $W_{out}$ (r=1). Here, γ represents a training rate for adjusting the update of the matrix $W_{out}$.

$$W_{out}^{r=1} = W_{out}^{r=0} - \gamma \frac{\partial E^{r=0}}{\partial W_{out}^{r=0}} \quad (16)$$
$$= W_{out}^{r=0} - \gamma \frac{\partial E^{r=0}}{\partial y^{r=0}} \frac{\partial y^{r=0}}{\partial W_{out}^{r=0}} =$$
$$W_{out}^{r=0} - \gamma (y^{r=0} - y^*)(1 - y^{r=0})y^{r=0}x^{r=0}$$

(Process C) The training execution unit 516 calculates an error of the hidden layer 513 based on the local error and the matrix $W_{out}$ (r=0). Further, the training execution unit 516 calculates the local error of the hidden layer 513 based on the error of the hidden layer 513 and the partial differential of the matrix $W_{in}$ (r=0), as in (process B). The partial differential of the matrix $W_{in}$ (r=0) is given by Equation (17). The training execution unit 516 executes the arithmetic operation of Equation (18) using the value u(t) of the input layer 512 and the local error of the hidden layer 513, and updates the matrix $W_{in}$ (r=1).

$$\frac{\partial E^{r=0}}{\partial W_{in}^{r=0}} = E^{r=0}(1-y^{r=0})y^{r=0}W_{out}^{r=0}(1-x^{r=0})x^{r=0}u \quad (17)$$

$$W_{in}^{r=1} = W_{in}^{r=0} - \gamma(W_{out}^{r=1} - W_{out}^{r=0})_{out}^{r=0}W(1-x^{r=0})x^{r=0}u \quad (18)$$

(Process D) The training execution unit 516 sets the updated model parameters in the neural network 502 and executes the arithmetic operation of Equations (13) to (15) to calculate an error of the output layer 514. When the error of the output layer 514 after the update is less than the error of the output layer 514 before the update, the training execution unit 516 stores the updated model parameters in the model storage unit 522. When the error of the output layer 514 after the update is greater than the error of the output layer 514 before the update, the training execution unit 516 returns the neural network 502 and the model storage unit 522 to the state before the update, and repeats the same process using other training data.

The processes from (process A) to (process D) have been described above.

During execution of each update process, the training execution unit 516 stores, in the temporary storage unit 523, $x^{r=0}$, $y^{r=0}$, $W_{out}$ (r=0), $W_{in}$ (r=0), and $W_{out}$ (r=1), and $W_{in}$ (r=1) used in the arithmetic operations of Equations (13) to (18). In consideration of speeding up the processing, it is desirable that the temporary storage unit 523 be realized using a storage device that can access information at high speed.

The training execution unit 516 repeatedly executes (process A) to (process D), and ends the training process when reaching a state that the error E does not decrease. Note that the training execution unit 516 may delete or overwrite the information stored in the temporary storage unit 523 when newly executing (process A) to (process D) after executing (process A) to (process D). The backpropagation has been described above.

In the training using the backpropagation, when the k-th adjustment process is started, the data storage unit 521 stores the training data including the input data u (t) and the target output y*(t), and the model storage unit 522 stores the matrix $W_{out}$=k-1) and the matrix $W_{in}$ (r=k-1) calculated at the (k-1)th time. Note that the model storage unit 522 also stores a matrix $W_{rec}$ (r=k-1) which will not be described herein. The training execution unit 516 calculates new matrices $W_{out}$ (r=k) and $W_{in}$ (r=k) using the node activity $x^{r=k}$ and the output $y^{r=k}$ output from the neural network 502, and compares the error E (r=k) with the error E (r=k-1).

That is, in the training using the backpropagation, the node activity $x^{r=k}$ is necessary only in the k-th training, and is the unnecessary information once the matrix $W_{out}$ (r=k) and the matrix $W_{in}$ (r=k) are updated. In addition, in the training using the backpropagation, when all the node activities $x^{r=i}$(t) (i is an integer from 0 to k) are held, since the node activity x(t) and the input data u(T) are expanded to a higher order and are the information generated by the number of repetitions, an enormous data capacity is required.

As described above, in the training using the backpropagation, at the end of the (k-1)th training, while the model parameters, that is, the matrix $W_{out}$ (r=k) and the matrix $W_{in}$ (r=k) are held, the node activity $x^{r=k-1}$(t), which has a large data capacity but is unnecessary information, is not held. For example, JP-A-2017-138808 that discloses the training using the backpropagation does not describe persistent holding of node activity.

Therefore, in the training using the backpropagation, since information on the node activity is not held, a task cannot be added and a neural network corresponding to a plurality of tasks cannot be built.

FIG. 6 is a diagram illustrating a difference between the training method according to the first embodiment and the conventional training method.

Here, the training of a model corresponding to each of task A, task B, and task D is assumed. (1) The training using conventional reservoir computing, (2) the training using the backpropagation, (3) the Multi-Task Learning, and (4) the training using reservoir computing according to the first embodiment will be described in this order.

(1) In the training using reservoir computing, when a task is simply added, a correct output may be obtained with an output limited to each of the tasks A and B. However, when input data including both values of the tasks A and B is input, erroneous output, that is, erroneous detection increases.

When the task A is trained, the accuracy of the output obtained by inputting the input data of the task A to the neural network is high. When the task B is trained after the training the task A, the accuracy of the output obtained by inputting the input data of each task to the neural network is high, while the accuracy of the output obtained when the input data of the task A and the task B is input to the neural network is low. When the task D is trained after the training the task B, the accuracy of the output obtained by inputting the input data of each task to the neural network is high, while the accuracy of the output obtained when the input data of the task A, the task B, and the task D is input to the neural network is low.

(2) In the training using the backpropagation, a model optimized for the immediately preceding task is generated, and information on past tasks is forgotten. That is, even if a task is added, a model corresponding to a plurality of tasks cannot be generated.

When the task A is trained, the accuracy of the output obtained by inputting the input data of the task A to the neural network is high. When the task B is trained after the training the task A, the accuracy of the output obtained by inputting the input data of the task B to the neural network is high, while the accuracy of the output obtained when the input data of the task A is input to the neural network is low. When the task D is trained after the training the task B, the accuracy of the output obtained by inputting the input data of the task D to the neural network is high, while the accuracy of the output obtained when the input data of each of the task A and the task B is input to the neural network is low.

(3) In the Multi-Task Learning, a model corresponding to a task (for example, task C, task E) combining a plurality of tasks may be generated. However, since it is necessary to prepare the training data for a plurality of tasks in advance, the data capacity required for the computer increases in proportion to the number of tasks, and the time required for training also increases.

When the task A is trained, the accuracy of the output obtained by inputting the input data of the task A to the neural network is high. When the task B is trained after the training the task A, the accuracy of the output obtained by inputting the input data of each task or the input data of a plurality of tasks to the neural network is high. Likewise, when the task D is trained after the training the task B, the accuracy of the output obtained by inputting the input data of each task or the input data of a plurality of tasks to the neural network is high.

By performing training using all input data, the recurrent neural network 112 corresponding to all tasks may be generated. However, the computation time required for re-training increases. In addition, when all the training data is stored, since the required data capacity increases, computers with limited performance, such as edge terminals, cannot be used. Although it is conceivable to store training data in a cloud and the like, the load on the communication network increases as the number of sensors increases.

(4) In the training using the reservoir computing according to the first embodiment, the recurrent neural network 112 corresponding to a plurality of tasks may be generated without preparing training data of a plurality of tasks in advance. That is, a task may be added at an arbitrary timing.

When the task A is trained, the accuracy of the output obtained by inputting the input data of the task A to the neural network is high. When the task B is trained after the training the task A, the accuracy of the output obtained by inputting the input data of each task or the input data of a plurality of tasks to the neural network is high. Likewise, when the task D is trained after the training of the task B, the accuracy of the output obtained by inputting the input data of each task or the input data of a plurality of tasks to the neural network is high.

The data capacity of the data stored in the node activity information storage unit 313 is sufficiently smaller than the data capacity of the training data. This effect becomes more pronounced as the addition of tasks. In addition, the effect of reducing the time required for additional training is almost proportional to the data capacity.

As described above, according to the first embodiment, the specification (structure) of the recurrent neural network corresponding to a plurality of tasks may be changed quickly and easily while suppressing the increase in the data capacity for use in the training. For example, the task B may be added to the recurrent neural network trained for the task A to generate a recurrent neural network that can process the tasks A and B in parallel.

Therefore, the training of a neural network (model) may be executed using a computer with limited performance. For example, a neural network may be trained using a mobile terminal such as a smartphone, an edge terminal installed in the vicinity of an edge computing sensor, and the like.

The training method using the reservoir computing described in the first embodiment is particularly effective for a system that requires flexible operation such as a change in a running system.

Second Embodiment

In a second embodiment, a specific example of the training method using the reservoir computing described in the first embodiment will be described. In the second embodiment, the history of the node activity, the output y, and the number N of data are stored in the node activity information storage unit 313 as the node activity information.

The task A is a task for identifying five types of acoustic information. The input data after data preprocessing used for the training of the task A is a time-series signal of 20 channels obtained by frequency-expanding a recorded audio file. The audio file stored in the data storage unit 311 is 250 MB in size, the signal after data preprocessing is 40 MB in size, and this signal is used as input data $u_{A\_i}(t)$ of a 20-dimensional vector (i is an integer from 1 to 20). The target output corresponding to the identification class is a five-dimensional vector $y^*_{A\_j}$ (j is an integer from 1 to 5). The number of nodes included in the reservoir 303 is 200. In this case, the matrix $W_{in}$ is a 200×20 matrix, and $W_{rec}$ is a 20×200 matrix.

In the training process of the task A, the node activity measurement unit 305 measures the node activity $x_k(t)$ (k is an integer from 1 to 200) as a 200-dimensional vector for the input data $u_{A\_i}(t)$. The measured node activity $x_k(t)$ is stored in the node activity information storage unit 313. Further, the number $N_A$ of the training data and the history of the output $y_A(t)$ output from the recurrent neural network 112 are stored in the node activity information storage unit 313.

After all the input data is input, the training preprocessing unit 306 reads the histories of all the node activities $x_k(t)$ and the histories of the outputs $y_A(t)$. The training preprocessing unit 306 executes the arithmetic operations of Equations (6) and (7) using the read history of the node activity $x_k(t)$ and the history of the output $y_A(t)$ to calculate the matrix $Task_{x\_A}$ and the matrix $Task_{y\_A}$. Here, the matrix $Task_{x\_A}$ is a 200×200 matrix, and the matrix $Task_{y\_A}$ is a 200×5 matrix.

The training execution unit 307 executes the arithmetic operation of Equation (5) using the matrix $Task_{x\_A}$ and the matrix $Task_{y\_A}$ to calculate the matrix $W_{out\_A}$. The matrix $W_{out\_A}$ is a 5×200 matrix. The training execution unit 307 stores the calculated matrix $W_{out\_A}$ in the model storage unit 312.

Figure 7:
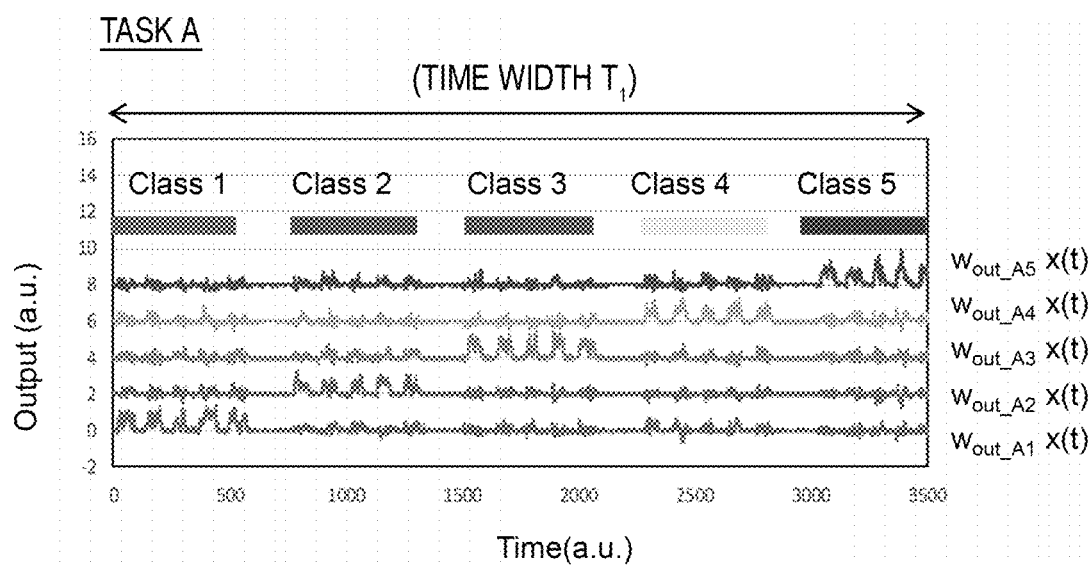
FIG. 7 is a diagram illustrating a result of executing a task using a recurrent neural network generated by the training method according to the first embodiment.

FIG. 7 is a diagram illustrating a result of executing the task A using the recurrent neural network 112 generated by the training method according to the first embodiment. FIG. 7 shows a graph representing a time-series signal of an output obtained by inputting the input data for evaluation to the recurrent neural network 112.

$W_{out\_Ap}$ refers to a p-th column of the matrix $W_{out\_A}$. The graph shown in FIG. 7 is obtained by plotting the inner product of an arbitrary column of $W_{out\_A}$ and the node activity $x_k(t)$.

Between time 0 and time 550 when the class 1 signal is input, the response of $W_{out\_A1} \times x_k(t)$ is large. Likewise, between time 800 and time 1400 when the class 2 signal is input, the response of $W_{out\_A2} \times x_k(t)$ is large.

By comparing the output $W_{out\_Ap} \times x_k(t)$ corresponding to the five classes, when the output unit 113 that outputs the class having the maximum value as the output result is mounted, the computer 100 may output result of identification of the sound.

The task B is a task for identifying three types of acoustic information different from the task A. The training unit 114 executes the training for generating the recurrent neural network 112 that can execute the tasks A and B at the same time. That is, the training unit 114 executes the training of the recurrent neural network 112 corresponding to the task C for identifying eight types of acoustic information.

The input data $u_{B\_i}(t)$ (i' is an integer from 1 to 20) forming the training data of the task B is a 20-dimensional vector, and the target output $y^*_{B\_j'}$ (j' is an integer from 1 to 3) forming the training data of the task B is a three-dimensional vector.

In the training process of the task C, the node activity measurement unit 305 measures the node activity $x_k(t)$ when the input data $u_{B\_i}(t)$ is input. The measured node activity $x_k(t)$ is stored as a history of node activity from time 3500 to 5500, and the number $N_B$ of training data and the history of the output $y_B(t)$ output from the recurrent neural network 112 are stored in the node activity information storage unit 313. At this time, the output $y_A(t)$ is stored as an eight-dimensional vector $y_C(t)$ in which the components from 6 to 8 are 0, and the output $y_B(t)$ is stored as an eight-dimensional vector $y_C(t)$ in which the components from 1 to 5 are 0.

After all the input data is input, the training preprocessing unit 306 reads the histories of all the node activities $x_k(t)$. Here, the read history of the node activity $x_k(t)$ is the history of the node activity $x_k(t)$ when t is in the range from 0 to 5500, that is, it is the history of the node activity $x_k(t)$ measured in the tasks A and B. The training preprocessing unit 306 executes the arithmetic operations of Equations (6) and (7) using the read history of the node activity $x_k(t)$ to calculate the matrix $Task_{x\_C}$ and the matrix $Task_{y\_C}$. Here, the matrix $Task_{x\_C}$ is a 200×200 matrix, and the matrix $Task_{y\_C}$ is a 200×8 matrix.

The training execution unit 307 executes the arithmetic operation of Equation (5) using the matrix $Task_{x\_C}$ and the matrix $Task_{y\_C}$ to calculate the matrix $W_{out\_C}$. The matrix $W_{out\_C}$ is an 8×200 matrix. The training execution unit 307 stores the calculated matrix $W_{out\_C}$ in the model storage unit 312.

Here, a difference between the output from the recurrent neural network trained using the conventional reservoir computing and the output from the recurrent neural network trained using the reservoir computing according to the present disclosure will be described.

In the training method using the conventional reservoir computing, the training of the task A is the same as that according to the present disclosure, and a matrix $W_{out\_A}$, which is a 5×200 matrix, is stored in the model storage unit 312. Meanwhile, in the training of the task B, a matrix $W_{out\_B}$, which is a 3×200 matrix calculated using only the training data of the task B, is stored in the model storage unit 312.

Figure 8:
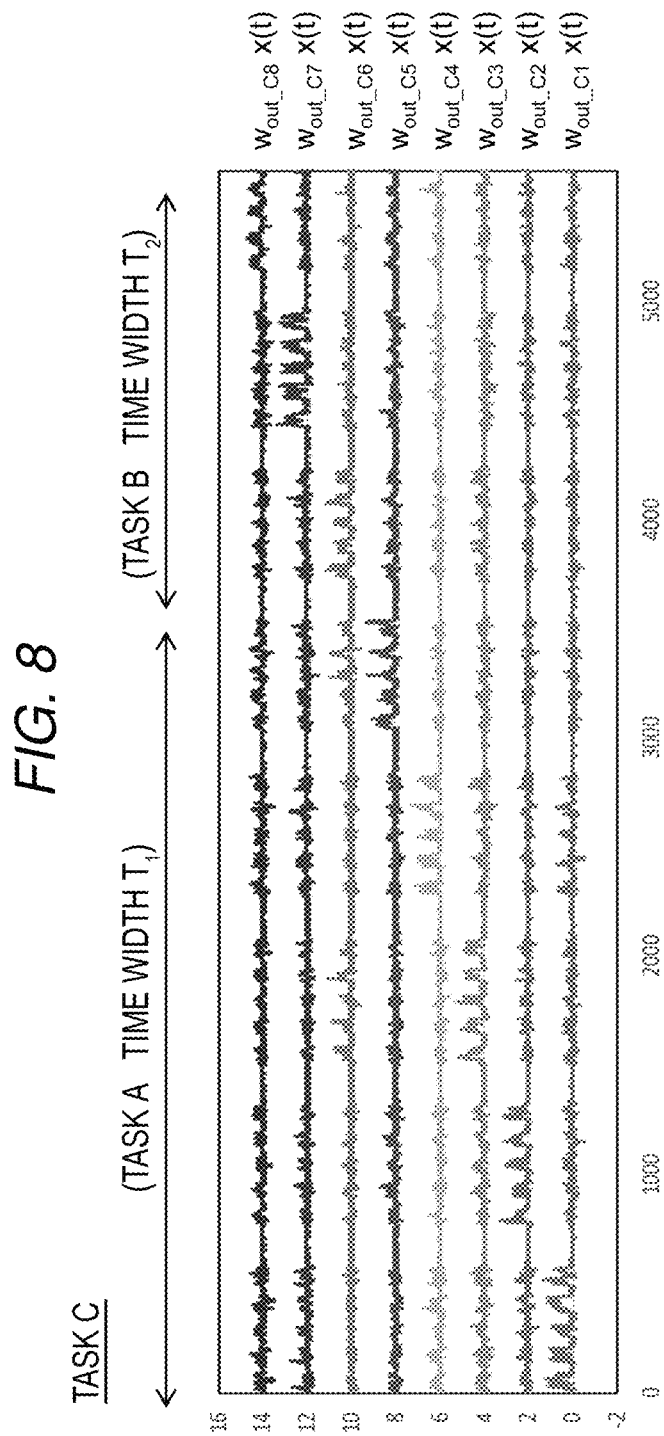
FIG. 8 is a diagram illustrating a result of executing a task using the recurrent neural network generated by the training method according to the first embodiment.
Figure 9:
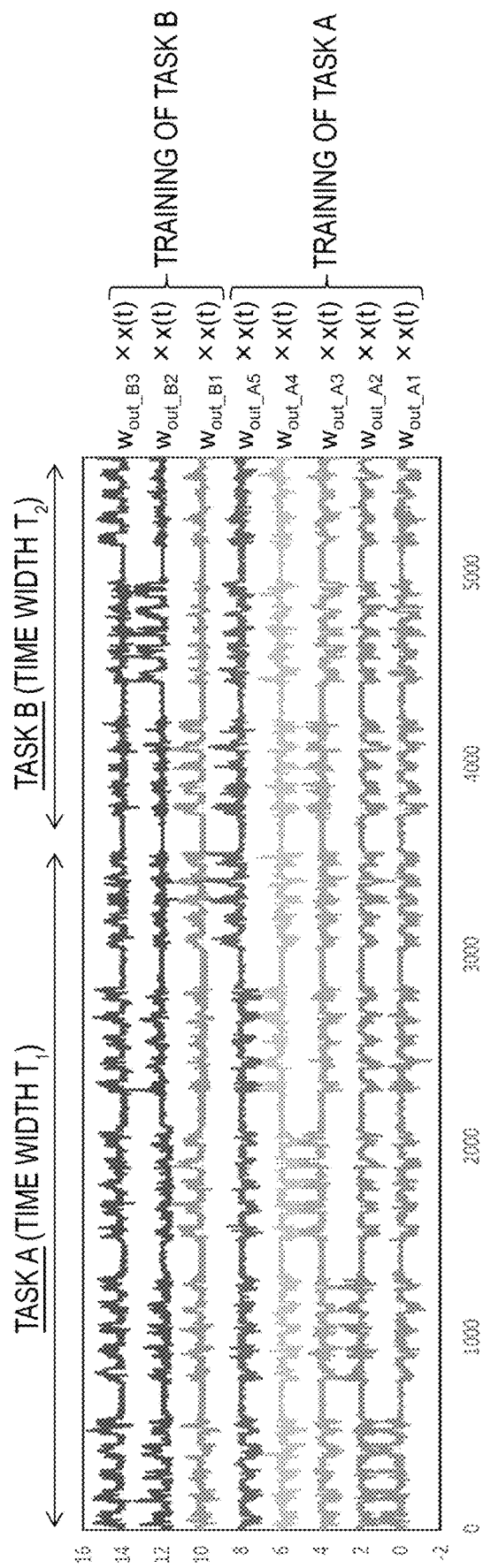
FIG. 9 is a diagram illustrating a result of executing a task using a recurrent neural network generated by a training method using the conventional reservoir computing.

FIG. 8 is a diagram illustrating a result of executing a task using the recurrent neural network 112 generated by the training method according to the first embodiment. FIG. 9 is a diagram illustrating a result of executing a task using the recurrent neural network generated by the training method using the conventional reservoir computing. FIGS. 8 and 9 show graphs representing time-series signals of outputs obtained by inputting input data for evaluation into a recurrent neural network.

The graph shown in FIG. 8 is obtained by plotting the inner product of an arbitrary column of $W_{out\_C}$ and the node activity $x_k(t)$.

Eight classes are identified using the recurrent neural network 112. Between time 0 to time 550, the response of $W_{out\_A1} \times x_k(t)$ is large. Likewise, between time 800 to time 1400 when the class 2 signal is input, the response of $W_{out\_A2} \times x_k(t)$ is large.

By comparing the output $W_{out\_Ap} \times x_k(t)$ corresponding to the five classes, when the output unit 113 that outputs the class having the maximum value as the output result is mounted, the computer 100 may output result of identification of the sound.

As shown in FIG. 8, an accurate result of identification may be obtained from the recurrent neural network 112 that is trained using the reservoir computing according to the present disclosure.

On the other hand, the output obtained from the recurrent neural network 112 trained using the conventional reservoir computing cannot obtain an accurate result of identification. For example, between time 0 to time 550, not only $W_{out\_A1} \times x_k(t)$ corresponding to class 1 but also $W_{out\_B2} \times x_k(t)$ and $W_{out\_B3} \times x_k(t)$ corresponding to classes 7 and 8 are also responding. Further, at around time 4000, the class originally intended to be detected is $W_{out\_B1} \times x_k(t)$ corresponding to class 6, but $W_{out\_A5} \times x_k(t)$ is also responding. That is, it can be seen that the training result of the task A is lost.

Third Embodiment

In a third embodiment, a specific example of the training method using the reservoir computing described in the first embodiment will be described. In the third embodiment, the values of Equations (6) and (7) and the number N of data are stored in the node activity information storage unit 313 as node activity information.

The tasks A and B are the same as those in the second embodiment. Further, the training data and the output of the tasks A and B are the same as those in the second embodiment.

In the training process of the task A, the node activity measurement unit 305 measures a node activity $x_k(t)$ (k is an integer from 1 to 200) as a 200-dimensional vector for the input data $u_{i\_A}(t)$.

The training preprocessing unit 306 executes the arithmetic operations of Equations (6) and (7) using the measured node activity $x_k(t)$, and updates the values of the matrix $Task_{x\_A}$ and the matrix $Task_{y\_A}$.

The training preprocessing unit 306 stores, in the node activity information storage unit 313, the matrix $Task_{x\_A}$ and the matrix $Task_{y\_A}$ calculated after all the input data $u_{A\_i}(t)$ are input, and the number $N_A$ of data.

The training execution unit 307 executes the arithmetic operation of Equation (5) using the matrix $Task_{x\_A}$ and the matrix $Task_{y\_A}$, calculates the matrix $W_{out\_A}$, and stores the matrix $W_{out\_A}$ in the model storage unit 312.

The output obtained from the recurrent neural network 112 after the training is the same as that shown in FIG. 7.

In the training process of the task C, the training preprocessing unit 306 reads the matrix $Task_{x\_A}$ and the matrix $Task_{y\_A}$ from the node activity information storage unit 313. The training preprocessing unit 306 combines the matrix $Task_{y\_A}$ with a 200×3 matrix in which all components are 0, and defines the matrix as a matrix $Task_{y\_C}$. Further, the training preprocessing unit 306 defines the matrix $Task_{x\_A}$ as a matrix $Task_{x\_C}$. Note that the matrix $Task_{x\_A}$ becomes the matrix $Task_{x\_C}$ as it is.

The node activity measurement unit 305 measures the node activity $x_k(t)$ when the input data $u_{i\_B}(t)$ is input.

The training preprocessing unit 306 converts the output $y_B(t)$ output from the recurrent neural network 112 into an eight-dimensional vector $y_C(t)$ in which components from 1 to 5 are 0. The training preprocessing unit 306 executes the arithmetic operations of Equations (6) and (7) using the output $y_C(t)$ and the node activity $x_k(t)$, and updates the values of the matrix $Task_{x\_C}$ and the matrix $Task_{y\_C}$.

The training preprocessing unit 306 calculates, as the matrix $Task_{x\_B}$ and the matrix $Task_{y\_B}$, a difference between the matrix $Task_{x\_C}$ and the matrix $Task_{y\_C}$ calculated after all the input data $u_{A\_i}(t)$ is input, and the matrix $Task_{x\_A}$ and the matrix $Task_{y\_A}$. The training preprocessing unit 306 stores the matrix $Task_{x\_B}$ and the matrix $Task_{y\_B}$, and the number $N_B$ of data, in the node activity information storage unit 313.

The training execution unit 307 executes the arithmetic operation of Equation (5) using the matrix $Task_{x\_C}$ and the matrix $Task_{y\_C}$, calculates the matrix $W_{out\_A}$, and stores the matrix $W_{out\_A}$ in the model storage unit 312.

The output obtained from the recurrent neural network 112 after the training is the same as that shown in FIG. 8.

Since the number of the input data $u_{A\_i}(t)$ of the task A is 5,500, a data capacity of 20×5500 is required. In addition, the node activity information storage unit 313 requires a data capacity of 200×200. As described above, the data capacity required for the node activity information storage unit 313 is sufficiently smaller than the data capacity required for holding the input data. This effect becomes more pronounced as the number of tasks increases.

Further, when the task C is trained using the reservoir computing according to the present disclosure, the required time is 40% shorter than the time required for Multi-Task Learning using the training data of the task A and the task B. Further, when a task to identify two classes is added and a task to identify a total of 10 classes is trained, the training time using the reservoir computing according to the present disclosure is 20% shorter than the Multi-Task Learning time. As described above, it can be seen that the present disclosure is useful fora system for repeatedly updating a neural network.

Fourth Embodiment

A fourth embodiment is partially different in the training method. Hereinafter, the fourth embodiment will be described while focusing on differences from the first embodiment. The hardware configuration of the computer 100 according to the fourth embodiment is the same as that of the first embodiment.

Figure 10:
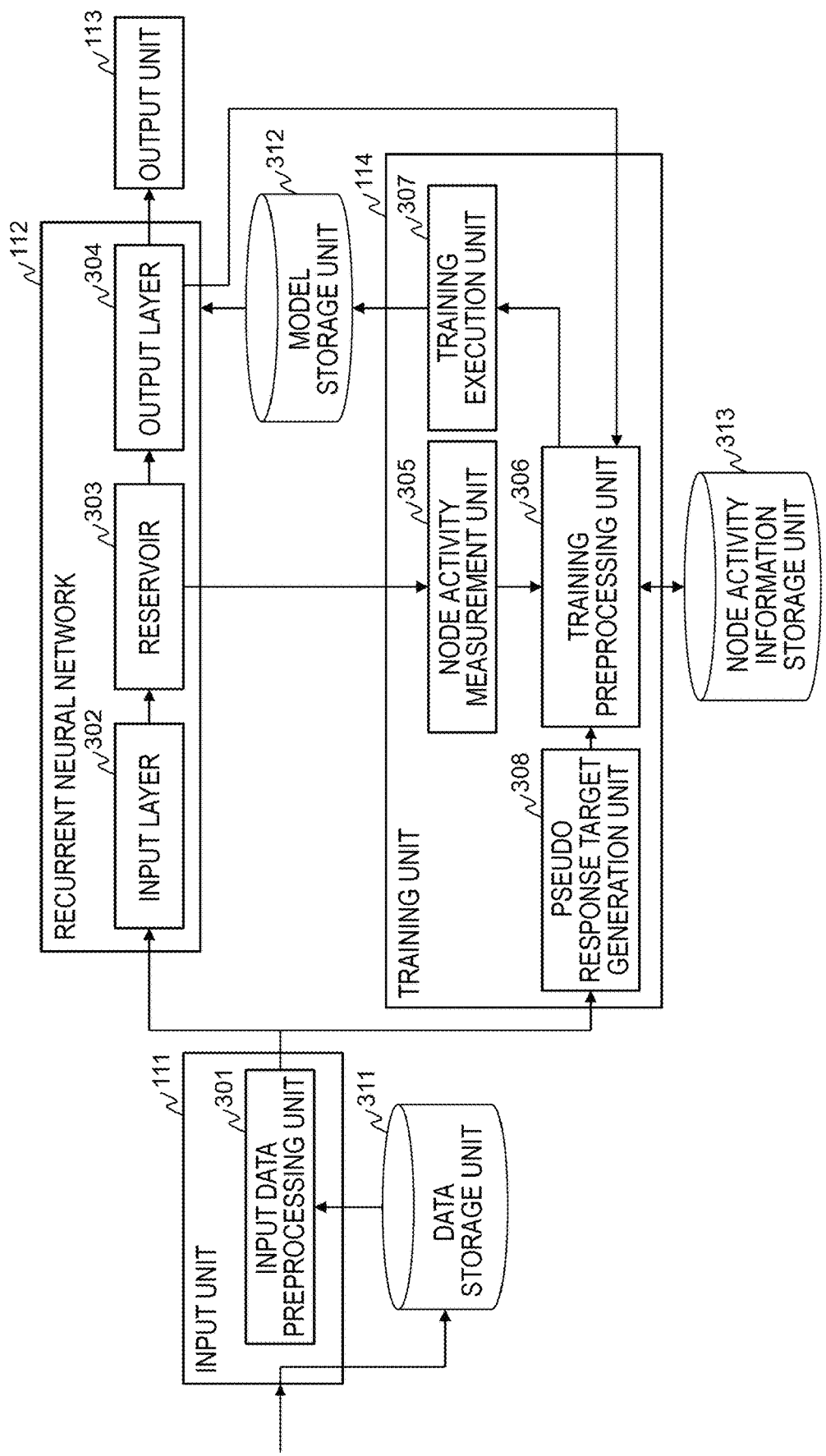
FIG. 10 is a diagram illustrating details of a functional configuration of reservoir computing according to a fourth embodiment.

FIG. 10 is a diagram illustrating details of a functional configuration of the reservoir computing according to the fourth embodiment.

In the fourth embodiment, a pseudo response target generation unit 308 is included. The pseudo response target generation unit 308 adds dimensions (components) corresponding to the pseudo response to the input data u(t) to the target output y*(t). For example, in the case of a task of classifying five classes, a six-dimensional vector y*'(t) obtained by adding one dimension corresponding to the pseudo response to a target output y*(t) which is a five-dimensional vector is output to the training preprocessing unit 306.

Figure 11:
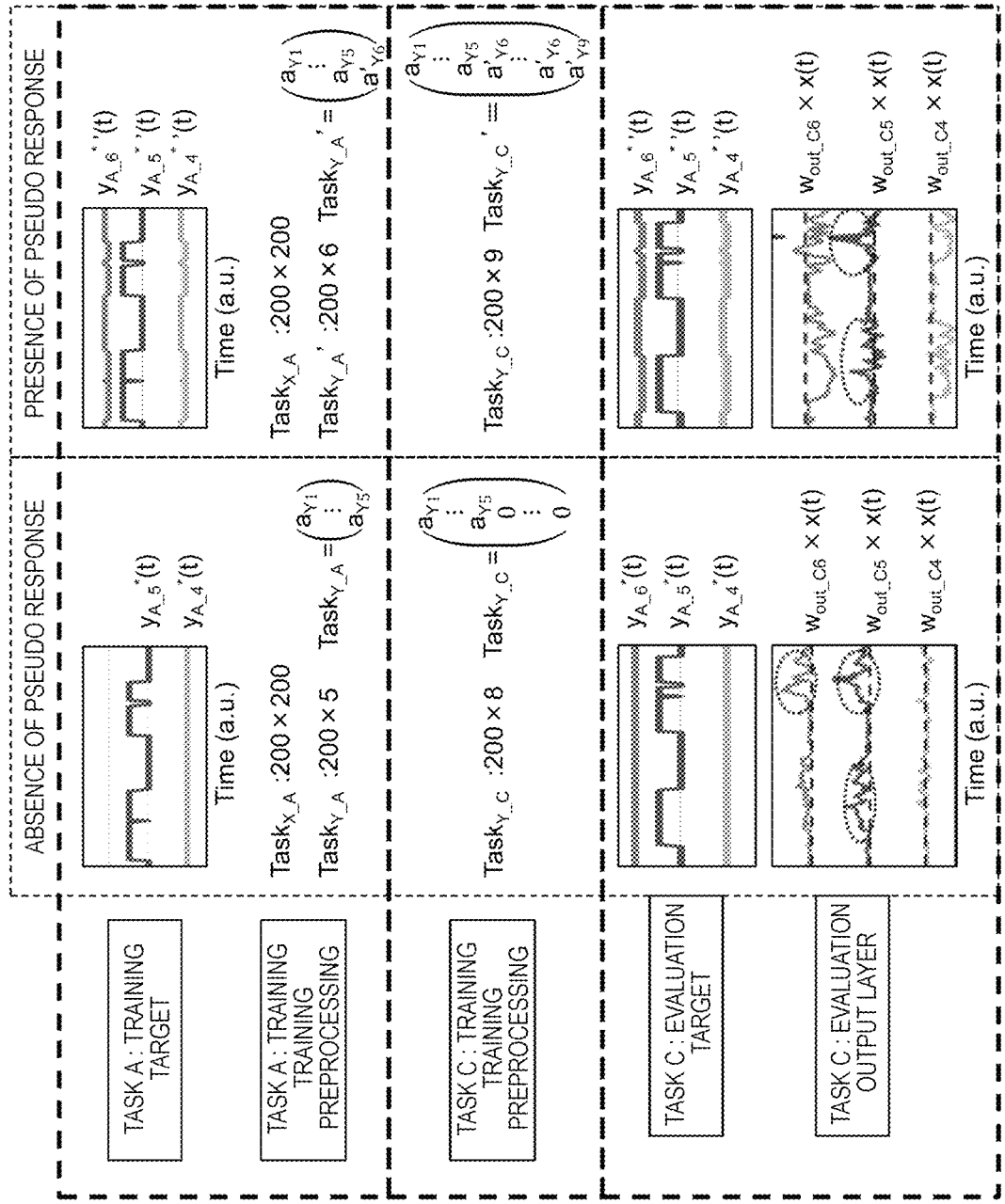
FIG. 11 is a diagram illustrating a training method and outputs according to the fourth embodiment.

FIG. 11 is a diagram illustrating a training method and outputs according to the fourth embodiment.

The column in FIG. 11 shows the data structure according to the presence or absence of the pseudo response target output. The rows indicate phases of the training.

FIG. 11 shows a part of a time-series signal of target outputs $y_{A\_4}*(t)$ and $y_{A\_5}*(t)$ as training targets of the task A in the training using a target output that does not include a pseudo response. The purpose of the training is to generate a recurrent neural network 112 that responds to the target output $y_{A\_5}*(t)$ corresponding to class 5 and that does not respond to the target output $y_{A\_4}*(t)$ corresponding to class 4 in the time range shown in FIG. 11.

In FIG. 11, when a sound having a certain volume level is input as a training target of the task A with respect to a target output $y_{A\_4}*(t)$ corresponding to class 4 which is not a detection target in the training using the target output including a pseudo response, the target output is changed to −0.1. Further, in addition to the target outputs $y_{A\_1}*(t)$ to $y_{A\_5}*(t)$, a new target output $y_{A\_6}*(t)$ is added during the training. In this case, when any one of the acoustic data of classes 1 to 5 is input at a certain volume level, the output is set to −0.1.

The target output $y_{A\_6}*(t)$ is called a pseudo response. At this time, the matrix $Task_{y\_A'}$ shown in Equation (7) is a 200×6 matrix. The matrix $Task_{y\_A}$ with the pseudo response added is described as the matrix $Task_{y\_A''}$.

In the first embodiment, during the training of the task B, the 200×5 matrix $Task_{y\_A}$ is combined with a 200×3 matrix of which all components are 0, and it is defined as the matrix $Task_{y\_C}$. In the fourth embodiment, the sixth row of the matrix $Task_{y\_A'}$ is copied from the seventh column to the ninth column, and it is defined as the matrix $Task_{y\_C''}$. The sixth to eighth columns are the elements to be added to the task C, and the ninth column is reserved for the tasks added after the task C.

In the training of the task B, the training preprocessing unit 306 performs data preprocessing of the input data $u_B(t)$, which is a 20-dimensional vector, and reads the matrix $Task_{y\_C''}$. Other processes are the same as those in the first embodiment.

The value of the output layer 304 for the input data for evaluation is calculated by using the recurrent neural network 112 in which the calculated matrix $W_{out\_C}$ is set. Although the matrix $W_{out\_C}$ is a 9×200 matrix, the ninth row is not used when processing a task.

In the lower part of FIG. 11, the input data for evaluation of the task C and the target class of the output layer 304 is plotted in terms of time. When the input data for evaluation of the task C is input to the recurrent neural network 112, most of the data is accurately identified, but some data may be erroneously detected in some cases. In the latter half of the evaluation phase of the task C in FIG. 11, the output corresponding to class 5 should originally respond in the output layer 304, but the output layer of class 6 responds at the same time as indicated by the circle. In the case of training using the pseudo response target output, the response of class 6 is suppressed when class 5 is input. This is due to the training history of not responding to the input of class 5 in $A_{y6}$, added during the training of the task A.

Fifth Embodiment

In a fifth embodiment, an example of training of the recurrent neural network 112 using odor information as input will be described.

The 16 oxide gas sensors are used as the input device 105. In this case, electrical signals are inputted in parallel from each sensor as the input data. All oxide gas sensors show different responses with respect to gases J, K, and L.

Figure 12:
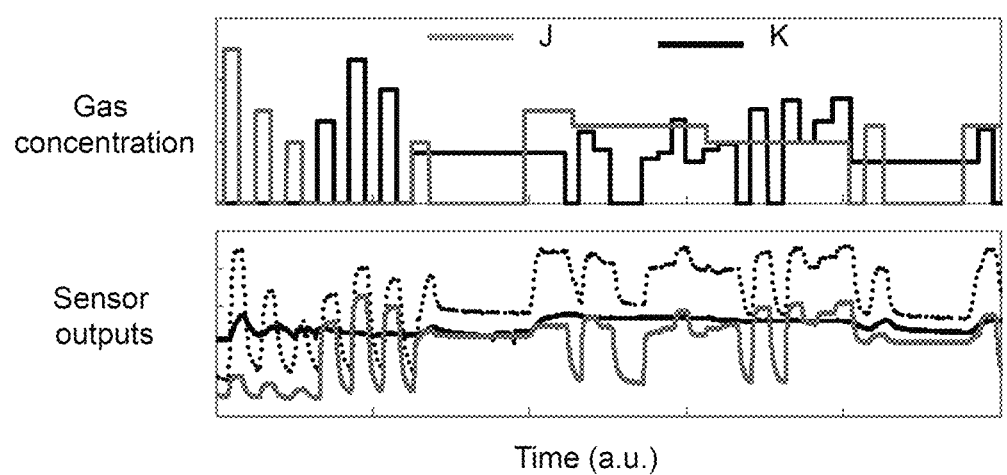
FIG. 12 is a graph illustrating an example of a relationship between a concentration of mixed gas and a response of a gas sensor according to a fifth embodiment.

FIG. 12 is a graph illustrating an example of the relationship between a concentration of mixed gas and the response of the gas sensor according to the fifth embodiment.

FIG. 12 shows the responses of four gas sensors selected from 16 gas sensors with respect to the concentrations of two types of gases J and K.

In the fifth embodiment, the purpose is to generate a recurrent neural network 112 for obtaining information on the concentration of each gas from the output of the gas sensors. The computer 100 that trains the recurrent neural network 112 uses a processor having almost the same arithmetic operation capability and power consumption as a smartphone. The capacity of the main storage device is 1 gigabyte.

Identification of the gases J and K is set to be the task A. In addition, identification of the gases J and L is set to be the task B. The tasks A and B use the same sensor and the same recurrent neural network 112.

It is possible that the sensor and the recurrent neural network 112 are separately prepared for each task to process the tasks A and B. However, in the case of using an edge terminal with limited installation space and power consumption, it is desirable to be able to cope with both the tasks A and B only by adjusting the recurrent neural network 112.

Figure 13A:
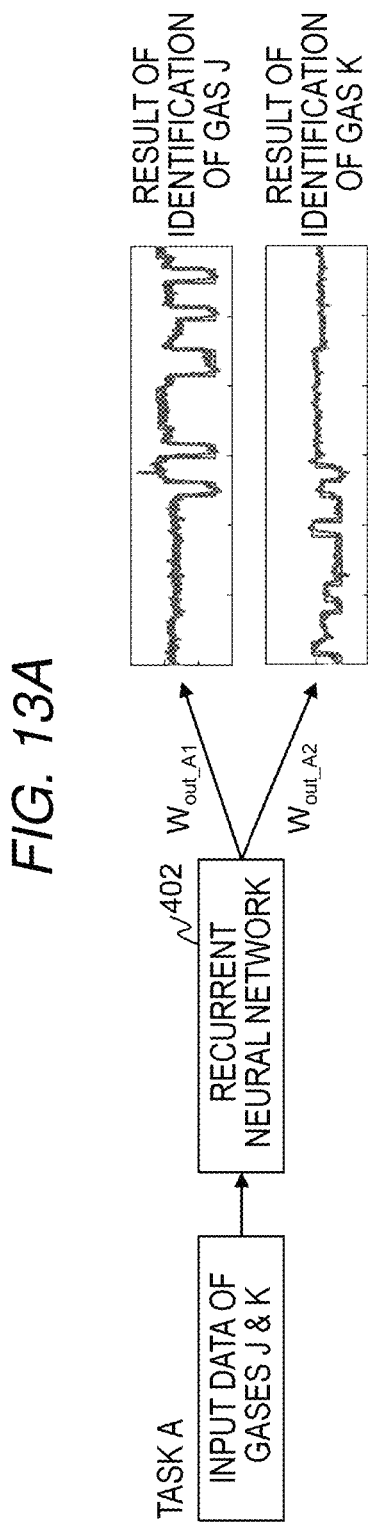
FIG. 13A is a diagram illustrating a result of executing a task using the recurrent neural network generated by the training method using the conventional reservoir computing.
Figure 13B:
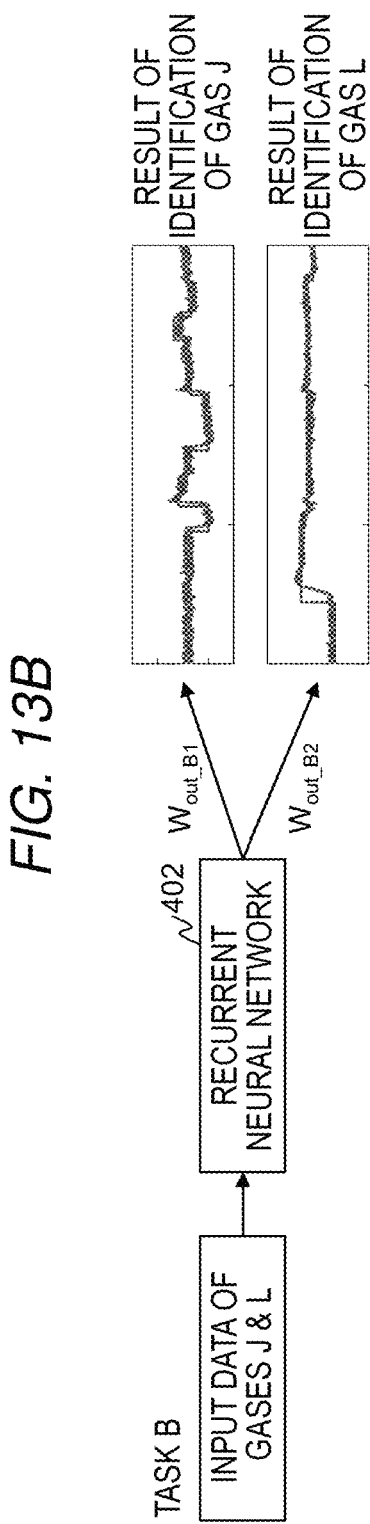
FIG. 13B is a diagram illustrating a result of executing a task using the recurrent neural network generated by the training method using the conventional reservoir computing.
Figure 13C:
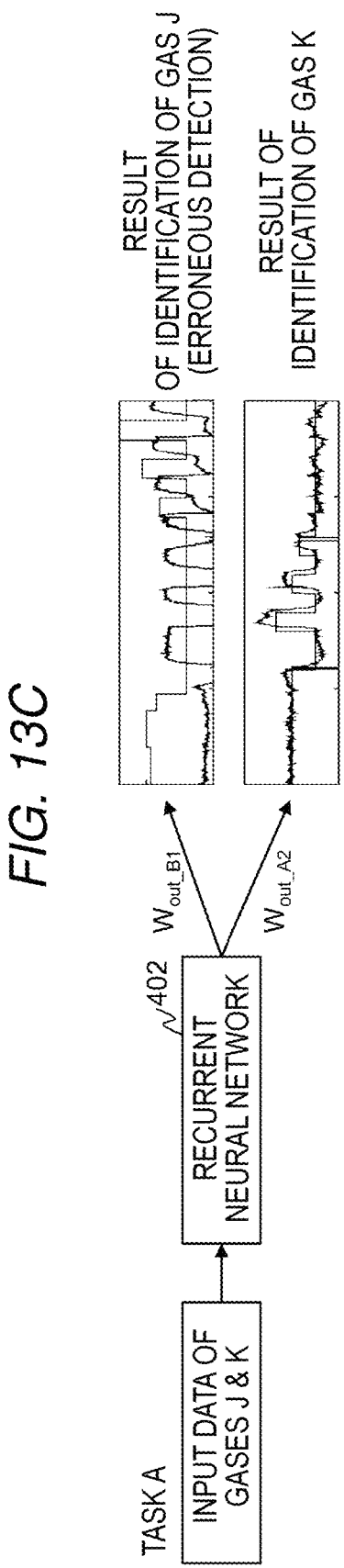
FIG. 13C is a diagram illustrating a result of executing a task using the recurrent neural network generated by the training method using the conventional reservoir computing.

FIGS. 13A, 13B, and 13C are diagrams illustrating results of executing a task using the recurrent neural network generated by a training method using the conventional reservoir computing.

In the graphs shown in FIGS. 13A, 13B, and 13C, the target output y*(t) and the output y(t) from the output layer 304 are displayed in a superimposed manner.

FIG. 13A shows a result of executing the task A after the training of the task A. In the training of the task A, the matrix $W_{out\_A}$ is stored in the model storage unit 312. In FIG. 13A, the elements of matrix $W_{out\_A}$ corresponding to the gas J are $W_{out\_A1}$ vector, and the elements of matrix $W_{out\_A}$ corresponding to the gas K are $W_{out\_A2}$ vector.

FIG. 13B shows a result of executing the task B after the training of only the task B, in addition to the output layer 304 corresponding to the gas L after the training of the task A. In this training, the matrix $W_{out\_B}$ is stored in the model storage unit 312. The elements of the matrix $W_{out\_B}$ corresponding to the gas J are $W_{out\_B1}$ vector, and the elements of the matrix $W_{out\_B}$ corresponding to the gas L are the $W_{out\_B2}$ vector.

FIG. 13C shows a result of executing the task A using the recurrent neural network 112 to which the training result $W_{out\_A2}$ for the gas K is added. At this time, the past training result is effective for identifying the gas K, and accurate detection may be provided. However, for the gas J, an erroneous output is obtained because the relationship between the gases J and K is lost from the recurrent neural network 112 during the training of the task B. Likewise, when the task B is executed based on the training result of the task A, an erroneous output is obtained for the gas J.

Figure 14A:
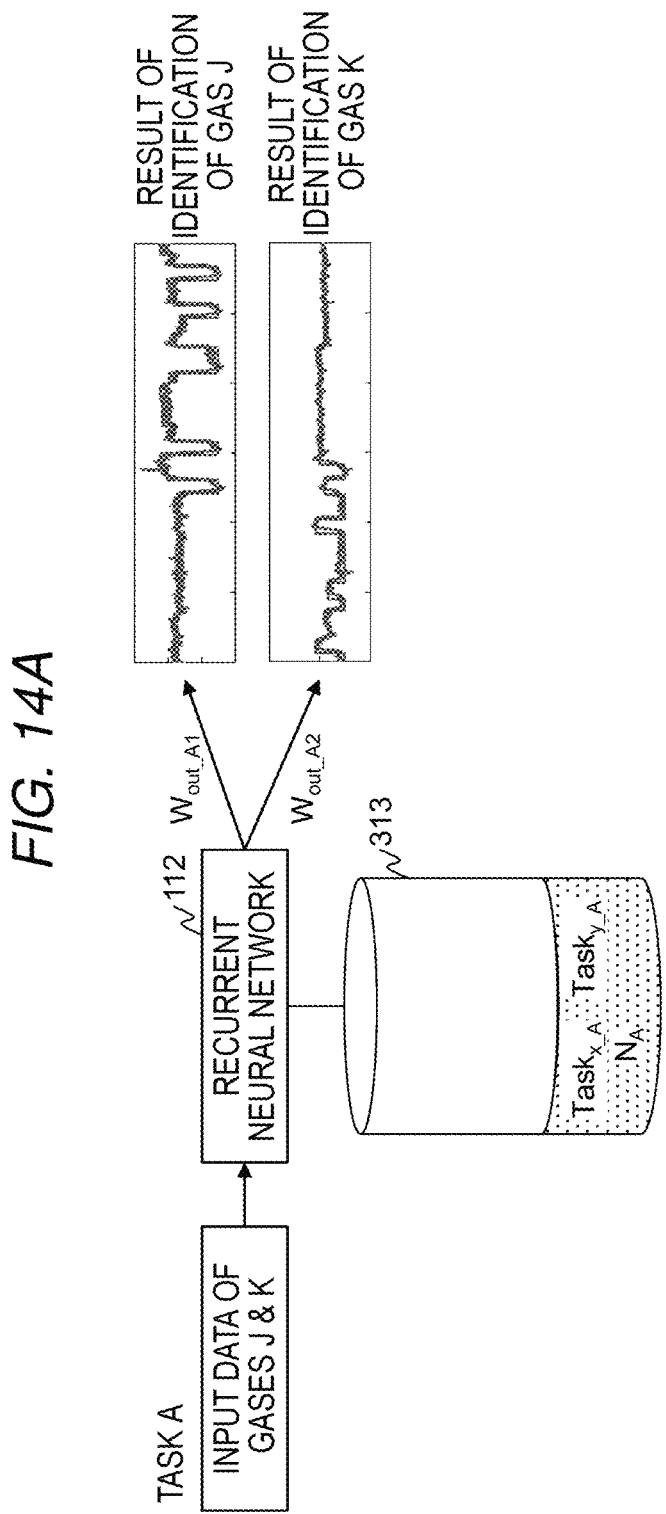
FIG. 14A is a diagram illustrating a result of executing a task using the recurrent neural network generated by the training method according to the first embodiment.
Figure 14B:
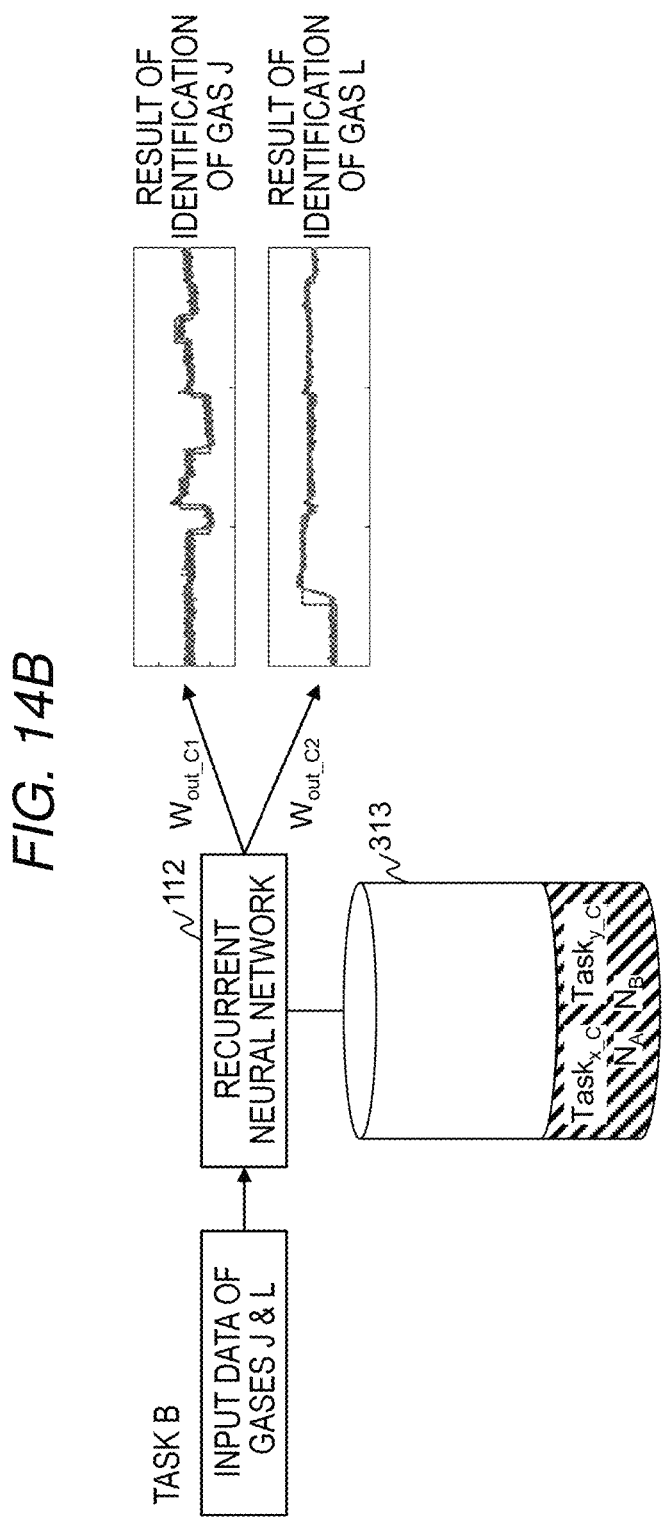
FIG. 14B is a diagram illustrating a result of executing a task using the recurrent neural network generated by the training method according to the first embodiment.
Figure 14C:
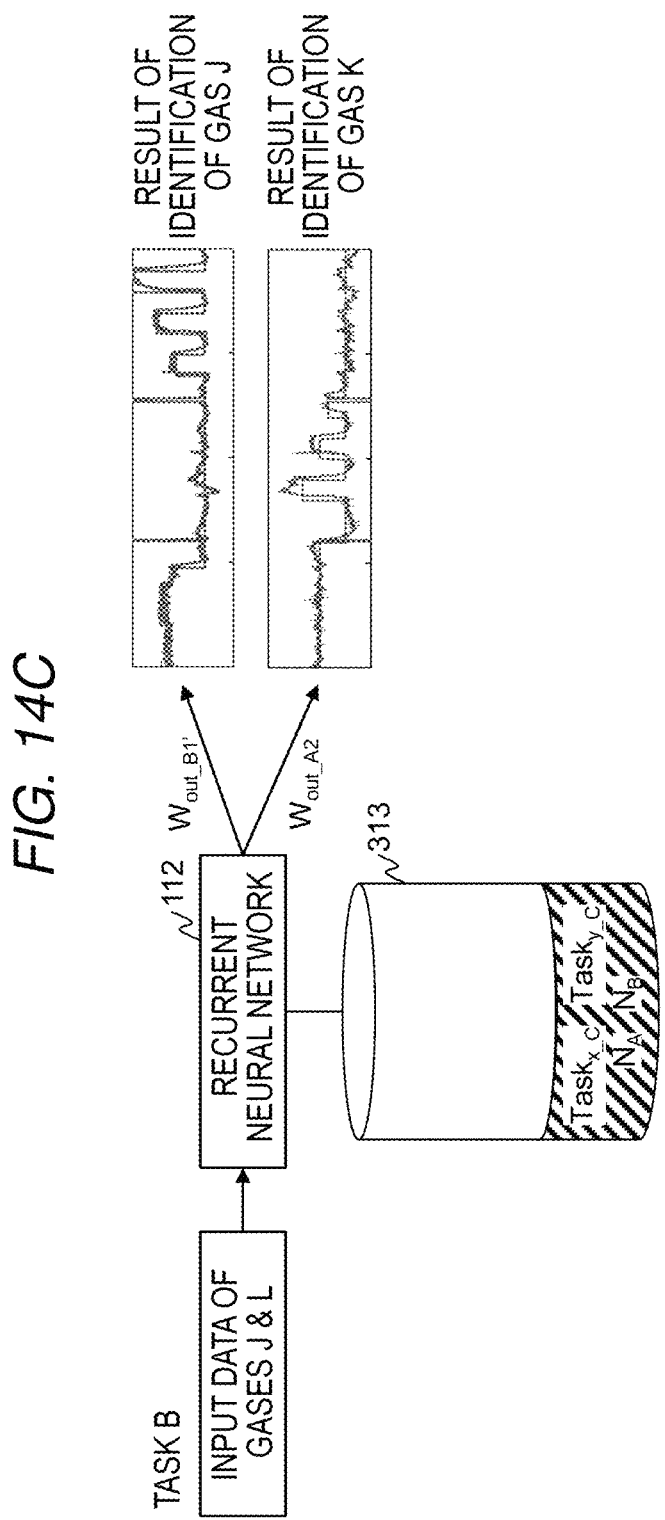
FIG. 14C is a diagram illustrating a result of executing a task using the recurrent neural network generated by the training method according to the first embodiment.

FIGS. 14A, 14B, and 14C are diagrams illustrating results of executing a task using the recurrent neural network 112 generated by the training method according to the first embodiment.

FIG. 14A shows a result of executing the task A after the training of the task A. FIG. 14B shows a result of executing the task B after the additional training of the task B.

As shown in Equation (11), the matrix $Task_{x\_C}$ and the matrix $Task_{y\_C}$ calculated from the node activities of the tasks A and B in the training of the task B may be calculated from the matrix $Task_{x\_A}$, the matrix $Task_{y\_A}$, the matrix $Task_{x\_B}$, and the matrix $Task_{y\_B}$. Therefore, instead of holding the matrix $Task_x$ and the matrix $Task_y$ for each task, the matrix $Task_x$ and the matrix $Task_y$ calculated by the latest training may be stored. Therefore, the training preprocessing unit 306 erases the matrix $Task_{x\_A}$ and the matrix $Task_{y\_A}$ from the node activity information storage unit 313, and stores the matrix $Task_{x\_C}$ and the matrix $Task_{y\_C}$. However, the number N of data is held for each task.

By holding the data as described above, the amount of data stored in the node activity information storage unit 313 hardly changes.

FIG. 14C shows a result of executing task A after the additional training of the task B. Unlike FIG. 13C, it can be seen that the accuracy of identifying the gas J is improved. This is an effect of storing the node activity information and training by using the information.

Note that, as in the fourth embodiment, a pseudo response may be added in consideration of the possibility of adding any gas that responds to the sensor group during the training of the task A for identifying the odor, and the pseudo response may be used for the training of the task B. When at least one gas sensor responds, a negative value may be set as a pseudo response.

As described in the first to fifth embodiments, according to the present disclosure, when a new task is added after the training of a certain task, catastrophic forgetting can be avoided and a recurrent neural network corresponding to multitasks can be generated quickly using information with a small amount of data.

Since the amount of data of the information held in the computer is small and the computational cost is low, the present disclosure may also be applied to an edge terminal installed in the vicinity of the sensor.

Note that the present disclosure is not limited to the embodiments described above, and includes various modifications. Further, for example, the configuration according to the embodiments described above has been described in detail in order to explain the present disclosure in an easy-to-understand manner, and is not necessarily limited to those having all the configurations described above. In addition, it is possible to add, delete, and replace other configurations for a part of the configuration of each embodiment.

Each of the configurations, functions, processing units, processing means, and the like described above may be realized by hardware by designing a part or all of those with, for example, an integrated circuit. In addition, the present disclosure can also be realized by software program code for realizing the functions of the embodiments. In this case, a storage medium storing the program code is provided to a computer, and a processor included in the computer reads the program code stored in the storage medium. In this case, the program code itself read from the recording medium realizes the functions of the embodiments described above, and the program code itself and the recording medium recording the program code is included the present disclosure. As a recording medium for supplying such a program code, for example, flexible disks, CD-ROMs, DVD-ROMs, hard disks, solid state drives (SSD), optical disks, magneto-optical disks, CD-Rs, magnetic tapes, non-volatile memory cards, and ROMs, and the like are used.

Further, the program code for realizing the functions described in the present embodiments may be implemented in a wide range of programs or script languages such as assembler, C/C ++, perl, Shell, PHP, Python, and Java (registered trademark).

Further, the program code of the software for realizing the functions of the embodiments is distributed through a network, so that the program code is stored in a recording unit such as a hard disk or a memory of a computer or a recording medium such as a CD-RW or a CD-R, and a processor included in a computer may read and execute the program code stored in the recording unit or the recording medium.

In the embodiments described above, the control lines and the information lines show those considered to be necessary for explanation, and it is not necessarily limited that all the control lines and information lines are shown necessarily on the product. All components may be interconnected.

What is claimed is:

1. A computer system that generates, as a model, a recurrent neural network used for a task of obtaining an output result for input data to be processed, the computer system comprising:
at least one computer having a processor and a storage device connected to the processor,
wherein the recurrent neural network includes an input layer, a reservoir, and an output layer,
wherein the input layer includes a first node that receives a plurality of time-series data,
wherein the reservoir receives an output from the input layer, and includes a plurality of second nodes that form a recurrent network,
wherein the output layer includes third nodes that receive an output from the reservoir,
wherein the processor is configured to:
execute a training process of calculating a weighting factor indicating a strength of a connection between the second nodes and the third nodes using input data including a value of at least one component and training data including a target output result including a value of at least one component,
store, as node activity information, information of node activity that is an output value of each of the plurality of second nodes measured during execution of the training process of a task,
store model information that defines a structure of the recurrent neural network,
in response to receiving a training execution request for a second task after completion of the training process of a first task, calculate the weighting factor of the recurrent neural network used for a third task, which is a combination of the first task and the second task, based on the training data of the second task, the node activity information, and the model information as a first process, that includes calculating a first value from a first equation $$\text{Task}_y = \frac{1}{N}\sum_t X^T y$$

wherein N represents a number of the training data, X represents an n×n matrix of node activity, n being an integer greater than 1, T represents a transposed matrix X, and Σ represents a summation of time span of the training data of a corresponding task, based on the target output result, time-series data of node activity of each of the plurality of second nodes measured during the execution of the training process of the third task, and the node activity information, and calculating a second value from a second equation $$\text{Task}_X = \frac{1}{N}\left(\sum_t X^T X\right)^{-1}$$

based on the time-series data of the node activity of each of the plurality of second nodes measured during the execution of the training process of the third task, and the node activity information,
update the stored model information based on the calculated weighting factor as a second process, and
update the stored node activity information based on the first value from the first equation, the second value from the second equation, and the node activity of each of the second nodes measured during execution of the training process of the third task as a third process.

2. The computer system according to claim 1,
wherein, when executing the training process of the third task, the processor is configured to set a number of third nodes in the output layer as a same number as a sum of components included in the target output result of the first task and components included in the target output result of the second task.

3. The computer system according to claim 2,
calculate the weighting factor based on the first value and the second value, and
update the node activity information based on the number of the input data input in the training process of the third task.

4. The computer system according to claim 2,
wherein the processor is configured to:
update the target output result by adding a component to the input data to the target output result, and
execute the training process of the third task using the training data including the input data and the updated target output result.

5. A model training method, executed by a computer system, for generating, as a model, a recurrent neural network used for a task of obtaining an output result for input data to be processed,
wherein the computer system comprises at least one computer having a processor and a storage device connected to the processor,
wherein the recurrent neural network includes an input layer, a reservoir, and an output layer,
wherein the input layer includes a first node that receives a plurality of time-series data,
wherein the reservoir receives an output from the input layer, and includes a plurality of second nodes that form a recurrent network,
wherein the output layer includes third nodes that receive an output from the reservoir, the method comprising:
executing a training process of calculating a weighting factor indicating a strength of a connection between the second nodes and the third nodes using input data including a value of at least one component and training data including a target output result including a value of at least one component;
storing, as node activity information, information of node activity that is an output value of each of the plurality of second nodes measured during execution of the training process of a task;
storing model information that defines a structure of the recurrent neural network,
in response to receiving a training execution request for a second task after completion of the training process of a first task, calculating the weighting factor of the recurrent neural network used for a third task, which is a combination of the first task and the second task, with the recurrent neural network based on the training data of the second task, the node activity information, and the model information as a first step, that includes calculating a first value from a first equation $$\text{Task}_y = \frac{1}{N}\sum_t X^T y$$

wherein N represents a number of the training data, X represents an n×n matrix of node activity, n being an integer greater than 1, T represents a transposed matrix X, and $\Sigma$ represents a summation of time span of the training data of a corresponding task, based on the target output result, time-series data of node activity of each of the plurality of second nodes measured during the execution of the training process of the third task, and the node activity information, and calculating a second value from a second equation $$\text{Task}_X = \frac{1}{N}\left(\sum_t X^T X\right)^{-1}$$

based on the time-series data of the node activity of each of the plurality of second nodes measured during the execution of the training process of the third task, and the node activity information;

a second step of updating the stored model information based on the calculated weighting factor; and a third step updating the stored node activity information based on the first value from the first equation, the second value from the second equation, and the node activity of each of the second nodes measured during execution of the training process of the third task.

6. The model training method according to claim 5, wherein the first step includes a step of when executing the training process of the third task, setting a number of the third nodes in the output later to be a same number as a sum of components included in the target output result of the first task and components included in the target output result of the second task.

7. The model training method according to claim 6, a step of calculating the weighting factor based on the first value and the second value, and
wherein the third step includes a step of updating the node activity information based on the number of the input data input in the training process of the third task.

8. The model training method according to claim 6, wherein the first step includes:
a step of updating the target output result by adding a component to the input data to the target output result; and
a step of executing the training process of the third task by using the training data including the input data and the updated target output result.

* * * * *